United States Patent
Wei et al.

(10) Patent No.: US 11,232,493 B2
(45) Date of Patent: Jan. 25, 2022

(54) GPS AND WIRELESS INTEGRATED FLEET MANAGEMENT SYSTEM AND METHOD

(71) Applicant: E-LANTIS Corporation, San Diego, CA (US)

(72) Inventors: Hongfeng Wei, Ceritos, CA (US); Sid Forougi, Carlsbad, CA (US)

(73) Assignee: e-LANTis Corporation, LaJolla, CA (US)

( * ) Notice: Subject to any disclaimer, the term of this patent is extended or adjusted under 35 U.S.C. 154(b) by 544 days.

(21) Appl. No.: 15/359,921

(22) Filed: Nov. 23, 2016

(65) Prior Publication Data

US 2017/0262908 A1    Sep. 14, 2017

Related U.S. Application Data

(63) Continuation of application No. 12/492,929, filed on Jun. 26, 2009, now Pat. No. 9,519,921.

(60) Provisional application No. 61/076,265, filed on Jun. 27, 2008.

(51) Int. Cl.
| | |
|---|---|
| *G06Q 30/04* | (2012.01) |
| *G06Q 10/02* | (2012.01) |
| *G06Q 10/04* | (2012.01) |
| *G06Q 10/06* | (2012.01) |
| *G06Q 10/08* | (2012.01) |

(52) U.S. Cl.
CPC ............ *G06Q 30/04* (2013.01); *G06Q 10/02* (2013.01); *G06Q 10/047* (2013.01); *G06Q 10/06* (2013.01); *G06Q 10/08355* (2013.01)

(58) Field of Classification Search
CPC ...... G06Q 30/40; G06Q 10/02; G06Q 10/047; G06Q 10/06; G06Q 10/08355
USPC ........................................................ 705/5
See application file for complete search history.

(56) References Cited

U.S. PATENT DOCUMENTS

| | | |
|---|---|---|
| 4,212,069 A | 7/1980 | Baumann |
| 5,428,546 A | 6/1995 | Mukesh et al. |
| 5,845,227 A | 12/1998 | Peterson |
| (Continued) | | |

FOREIGN PATENT DOCUMENTS

WO    WO-2009058117 A1 *  5/2009    ............. G06Q 10/08

OTHER PUBLICATIONS

Layton, Lyndsey; "Efforts to Repair Aging System Compound Metro's Problems"; Jun. 5, 2005. (Year: 2005).*

(Continued)

*Primary Examiner* — George Chen
*Assistant Examiner* — Dione N. Simpson
(74) *Attorney, Agent, or Firm* — John V. Daniluck; Dentons Bingham Greenebaum LLP

(57) ABSTRACT

A fleet management system has a chauffeur or driver module and a communication and positioning module associated with each fleet vehicle, and a backend monitoring and control system located at a fleet data center in communication with each vehicle. The system monitors each trip automatically and generates time stamps at the start of a trip, a pick up location, a drop off location, and return of the vehicle to a garage at the end of a trip. Vehicle status information is collected and stored along with timestamps. The information is used to generate billing and payroll accounts, and also in monitoring conditions of fleet vehicles and generating alerts as needed. Turn-by-turn route instructions are provided to drivers by voice output on request.

16 Claims, 18 Drawing Sheets

(56) References Cited

U.S. PATENT DOCUMENTS

| | | | |
|---|---|---|---|
| 6,070,123 | A | 5/2000 | Beyer et al. |
| 6,078,863 | A | 6/2000 | Schmischke et al. |
| 6,088,648 | A | 7/2000 | Shah et al. |
| 6,101,433 | A | 8/2000 | Flicker |
| 6,150,961 | A | 11/2000 | Alewine et al. |
| 6,339,745 | B1 * | 1/2002 | Novik ............... G07C 5/008 |
| | | | 342/357.31 |
| 6,356,838 | B1 | 3/2002 | Paul |
| 6,430,496 | B1 | 8/2002 | Smith et al. |
| 6,580,364 | B1 * | 6/2003 | Munch ............ B60C 23/0408 |
| | | | 340/447 |
| 6,584,403 | B2 | 6/2003 | Bunn |
| 6,675,150 | B1 | 1/2004 | Camer |
| 6,694,248 | B2 | 2/2004 | Smith et al. |
| 6,711,500 | B2 | 3/2004 | Chen |
| 6,756,913 | B1 | 6/2004 | Ayed |
| 6,826,460 | B2 | 11/2004 | Kittell |
| 6,898,493 | B2 | 5/2005 | Ehrman et al. |
| 6,947,881 | B1 | 9/2005 | Murakami et al. |
| 6,965,323 | B2 | 11/2005 | Uehara et al. |
| 6,970,783 | B2 | 11/2005 | Knockeart et al. |
| 6,982,635 | B2 | 1/2006 | Obradovich |
| 7,089,110 | B2 | 8/2006 | Pechatnikov et al. |
| 7,127,411 | B2 | 10/2006 | Ho |
| 8,131,456 | B2 | 3/2012 | Mahalingaiah et al. |
| 2002/0052751 | A1 | 5/2002 | Ebata |
| 2002/0070881 | A1 * | 6/2002 | Marcarelli ............ G08G 1/20 |
| | | | 340/988 |
| 2002/0077750 | A1 | 6/2002 | McDonald |
| 2002/0077876 | A1 | 6/2002 | O'Meara et al. |
| 2003/0040865 | A1 | 2/2003 | Rigazio |
| 2003/0109985 | A1 | 6/2003 | Kotzin |
| 2003/0177062 | A1 | 9/2003 | Chen |
| 2004/0093280 | A1 | 5/2004 | Yamaguchi |
| 2004/0117332 | A1 | 6/2004 | Himebaugh |
| 2004/0177109 | A1 | 9/2004 | Lee |
| 2006/0034201 | A1 | 2/2006 | Umeda et al. |
| 2006/0059023 | A1 * | 3/2006 | Mashinsky ......... G06Q 10/02 |
| | | | 705/5 |
| 2006/0155439 | A1 | 7/2006 | Slawinski |
| 2006/0217885 | A1 * | 9/2006 | Crady ................. G01C 21/00 |
| | | | 701/469 |
| 2006/0235739 | A1 | 10/2006 | Levis et al. |
| 2006/0293835 | A1 | 12/2006 | Smith et al. |
| 2007/0103342 | A1 * | 5/2007 | Milleville ............ G08G 1/202 |
| | | | 340/988 |
| 2007/0198282 | A1 | 8/2007 | Williams et al. |
| 2007/0294033 | A1 | 12/2007 | Osentoski et al. |
| 2008/0140281 | A1 * | 6/2008 | Morris ............... G07C 5/0808 |
| | | | 701/31.4 |
| 2008/0154691 | A1 | 6/2008 | Wellman et al. |
| 2008/0189207 | A1 | 8/2008 | Wurster |
| 2009/0030885 | A1 | 1/2009 | DePasquale et al. |
| 2009/0037194 | A1 | 2/2009 | Roche |
| 2009/0048890 | A1 | 2/2009 | Burgh |
| 2009/0079555 | A1 | 3/2009 | De Carcer et al. |
| 2009/0313077 | A1 | 12/2009 | Wheeler |
| 2010/0299177 | A1 | 11/2010 | Buczkowski et al. |
| 2010/0312591 | A1 | 12/2010 | Wu |
| 2011/0130914 | A1 | 6/2011 | Shah et al. |

OTHER PUBLICATIONS

U.S. Appl. No. 12/492,929, NF Office Action dated Oct. 18, 2011, 10 page.
U.S. Appl. No. 12/492,929, Applicant Response filed Apr. 18, 2012, 7 pages.
U.S. Appl. No. 12/492,929, Final Rejection dated May 5, 2012, 11 pages.
U.S. Appl. No. 12/492,929, Applicant Response filed May 14, 2013, 9 pages.
U.S. Appl. No. 12/492,929, NF Office Action dated May 22, 2014, 17 pages.
U.S. Appl. No. 12/492,929, Applicant Response filed Nov. 24, 2014, 35 pages.
U.S. Appl. No. 12/492,929, NF Office Action dated Sep. 24, 2015, 8 pages.
U.S. Appl. No. 12/492,929, Applicant Response filed Mar. 24, 2016, 49 pages.
U.S. Appl. No. 12/492,929, Final Rejection dated Aug. 25, 2016, 9 pages.
U.S. Appl. No. 12/492,929, Applicant Response to Final filed Sep. 9, 2016, 12 pages.
U.S. Appl. No. 12/492,929, Advisory Action dated Sep. 15, 2016, 3 pages.
U.S. Appl. No. 12/492,929, Applicant Response to Advisory Action filed Sep. 21, 2016, 10 pages.
U.S. Appl. No. 12/492,929, Notice of Allowance dated Oct. 26, 2016, 7 pages.

* cited by examiner

GPS AND WIRELESS INTEGRATED FLEET MANAGEMENT SYSTEM AND METHOD

CROSS REFERENCE TO RELATED APPLICATIONS

This application is a continuation of U. S. patent application Ser. No. 12/492,99, filed Jun. 26, 2009, now issued as U.S. Pat. No. 9,519,921, which claims the benefit of U.S. provisional patent application No. 61/076,265 filed Jun. 27, 2008, the contents of which are incorporated herein by reference in their entirety.

BACKGROUND

1. Field of the Invention

This invention relates generally to a fleet management system and method for managing a fleet of vehicles.

2. Related Art

Fleet management is required in many businesses, such as limousine, trucking, and taxi businesses. The current management systems are not able to track vehicle or chauffeur status in real-time. Driver time-sheets are managed based on honesty, which means either business owner writes fixed hours for drivers or drivers record their working hours by themselves. Either of the two ways may lead to over or under paying drivers, which may lead to unnecessary expense or lawsuits for underpaying employees for business owners.

The current management systems cannot raise alerts automatically before chauffeurs or other drivers reach scheduled pick up locations if any emergencies happen, for example, if a chauffeur oversleeps or encounters bad traffic, or even accidents. The emergencies are often noticed when passengers complain to customer services that the chauffeur or driver did not show up on time. Without pre-emptive action on emergencies, such situations may often lead to poor customer satisfaction, refusal of payment or even compensations to the customers.

Another problem with many current fleet management systems is that they cannot enforce Geo-fencing (meaning enforcing affiliates business territories), which may cause unfair job dispatch. This often leads to bad and unnecessary competition among affiliates and service delay due to over/under estimate on affiliates' capacity.

Many current management systems cannot track vehicle status on battery, mileage, engine, brakes, gas, and the like in real-time, which may cause skips of scheduled maintenance or check-ups and undetected deliberated abuse of vehicles from unhappy employees. This often leads to very expensive and unnecessary vehicle repairs. In some cases, vehicle leases expire with low mileage due to unawareness of mileage usage on each of the vehicles in the fleet.

Current fleet management systems often require chauffeurs to be on the phone for status updates, directions, or urgent requests, which may cause potential hazard due to the distraction and may lead to traffic tickets/fines due to government regulation on cell phone usage while driving.

SUMMARY

In one embodiment, a fleet management system is provided which comprises a chauffer peer module or station (CPS), a positioning and communication module, and a backend office system (BOS). The positioning and communication module may include a global positioning system (GPS) and wireless communication unit (GWU). The CPS and GWU modules are located in the vehicle. The CPS module has an input for receiving data input from a driver, either automatically or optionally via a manual input, voice command, or the like. The CPS logs every step of a journey from starting the ignition in a garage to completing the service and bringing the vehicle back to the garage.

The GWU sends log information back to the BOS in real-time and this data is captured based on CPS request and stored into a service database. Using the real-time vehicle information, BOS provides real-time turn by turn information back to chauffeurs through their CPS units, if necessary. In one embodiment, turn-by-turn instructions are provided by voice output, so that the driver can concentrate on driving without having to look at instructions on a screen. The BOS is also able to provide urgent service re-schedule or re-routing information. After the service is completed, BOS generates customer rating/feedback reports, billing statements, payroll reports and vehicle maintenance reports if necessary. BOS can also export real-time data to other management systems for different clients.

This system provides integrated, automated and instantaneous/real-time fleet information. The system guides each chauffeur or driver to complete their service from garage out to garage in step by step automatically, logs required vehicle information during the service/route, enforces business rules, connects to the backend system or BOS for automatic billing and payroll processing and generates business or statistical reports for further management.

According to another embodiment, the system includes a data exchange platform which connects various back-office systems of different fleet affiliates or franchises which provide transportation services, such as different limousine services, taxi services, or the like for data sharing and exchange. This allows large fleets of vehicles to be managed in real time over broad geographies and may be extended to world-wide operation to other countries. Client position is matched to the closest available affiliate company, and the data exchange platform then forwards the order to the affiliate's database. After confirmation, the order is automatically dispatched to the requested vehicle/chauffeur to dispatch a vehicle to the client.

In one embodiment, a client or end user module or mobile portal is provided. This may be downloaded by clients and installed on a portable electronic communication device such as a mobile phone, personal digital assistant, portable or laptop computer, or the like. The mobile portal allows the user to locate the closest available vehicle and book a ride, or to make a reservation for a future ride. The request is automatically routed through the data exchange platform to the appropriate affiliate to dispatch a vehicle.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide a fleet management system which may be used for handling fleets used in various different types of businesses, such as limousine services, taxi services, trucking, ambulance services, and the like. In the following description, the embodiment described is a limousine service having a number of vehicles driven by chauffeurs. However, it should be understood that the same system may be used for tracking and managing other types of driving jobs, including trucking jobs, taxi services, ambulance services, and the like, and the term chauffeur should be understood to any trained driver who operates a self-propelled vehicle, such as an automobile, for a profession. The system may be used for managing different types of vehicles, including land vehicles such as taxis, cars, trucks and limousines, water vehicles such as ferries, water taxis, ships, and the like, as well as aircraft.

After reading this description it will become apparent to one skilled in the art how to implement the invention in various alternative embodiments and alternative applications. However, although various embodiments of the present invention will be described herein, it is understood that these embodiments are presented by way of example only, and not limitation.

Figure 1:
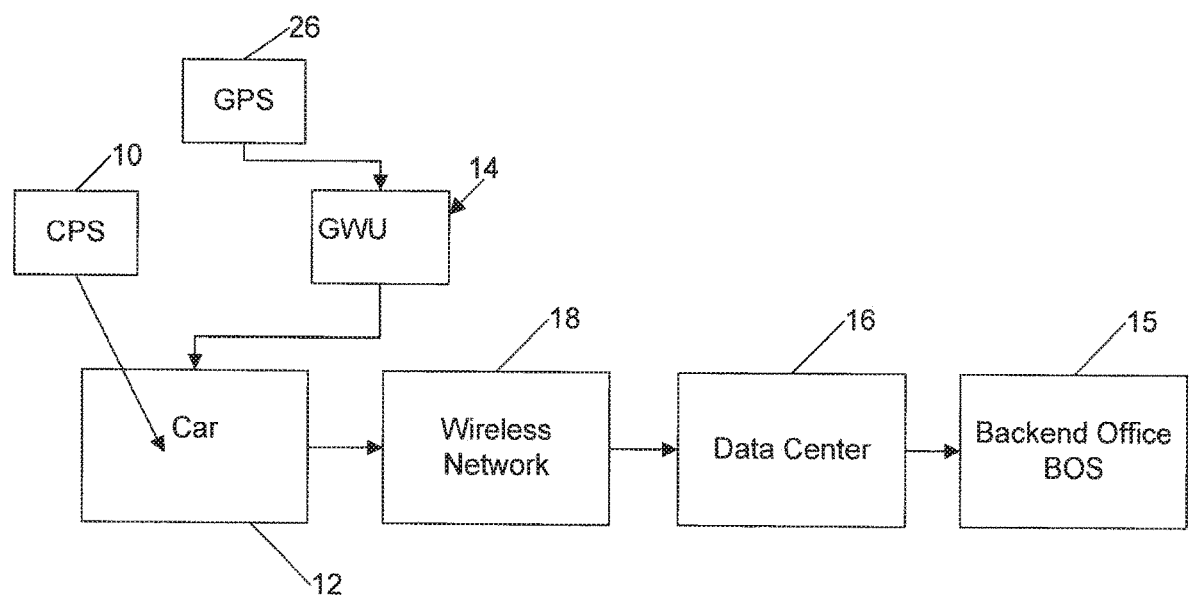
FIG. 1 is a schematic diagram of one embodiment of a fleet management system.
Figure 2:
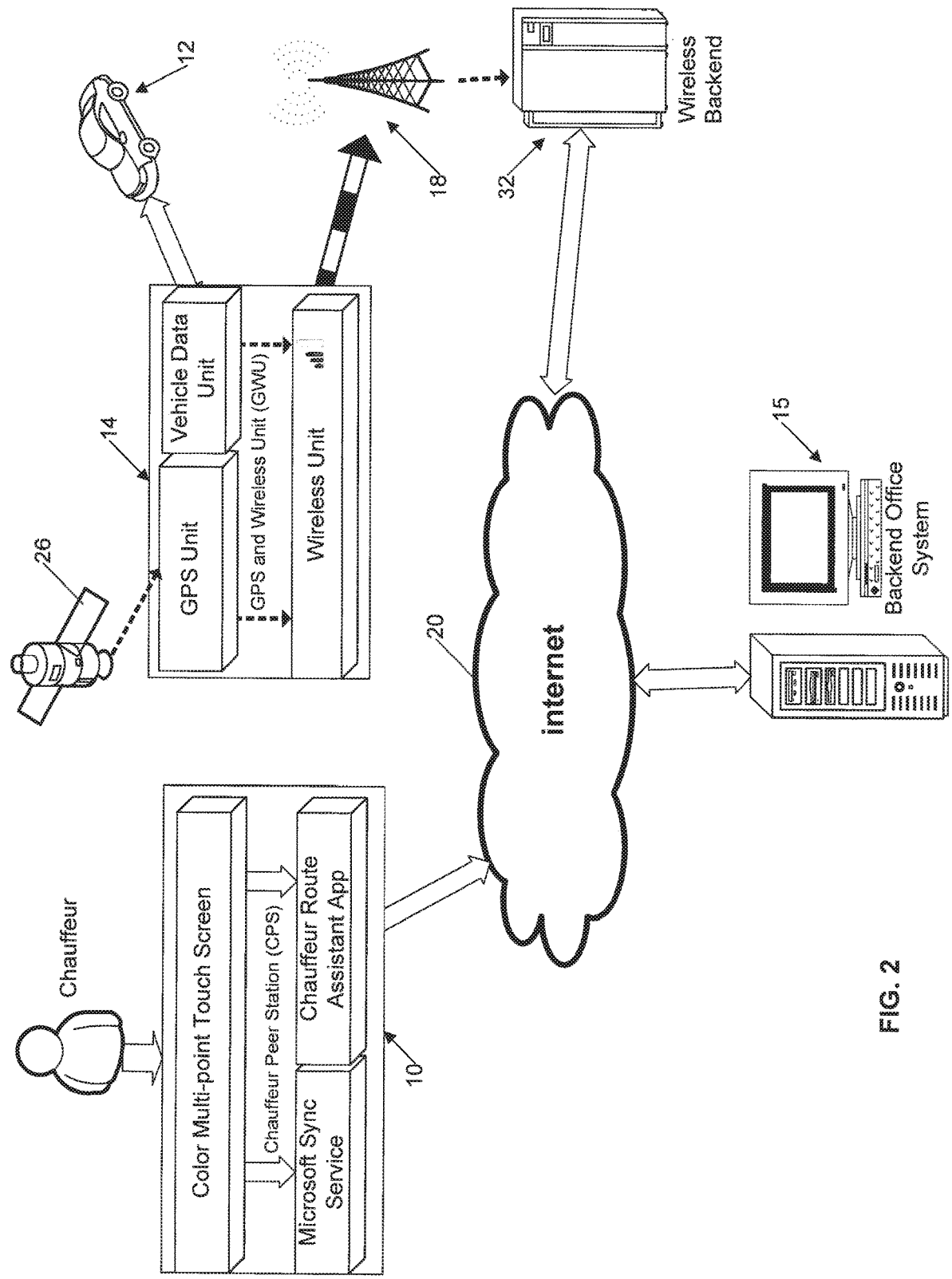
FIG. 2 is a more detailed block diagram of the components of the system of FIG. 1.

FIGS. 1 to 7 illustrate one embodiment of a fleet management system. As illustrated in FIG. 1, the system basically comprises a chauffeur peer station or CPS module 10 which is located in a vehicle 12, a positioning and communication or GWU module 14 which is also located in the vehicle, and a remote back end office (BOS) or control system 15 located at a data or management center 16. The BOS 15 communicates with an antenna of GWU module 14 and CPS module 10 via any suitable wireless network 18, as illustrated schematically in FIG. 1, and via the Internet 20, as illustrated in FIG. 2. The wireless network 18 may be a cellular network, a wireless wide area network (WWAN), a WiFi network, an Institute of Electrical and Electronics Engineers, Inc. (IEEE) 802.16 or WiMAX network, or other type of wireless network that employs any variety of wireless technology. The GWU module is also linked to the vehicle's on-board computer system in any suitable manner, such as a direct or indirect wire links or wireless links. Direct wire links may include a universal serial bus (USB) cable, a firewire cable, an RS-232 cable, or the like. Indirect wired links may include a packet switched or circuit switched network connection, an Ethernet network connection, a dial up modem connection, or the like. Wireless links may include an infrared link, a Bluetooth link, an Institute of Electrical and Electronics Engineers, Inc. (IEEE) 802.11 point-to-point link, an IEEE 802.16 or WiMAX link, a cellular link, or the like.

The chauffeur peer station (CPS) or module 10 has a handheld or embedded touch screen device 22, which helps chauffeurs or drivers to complete their routes and update the route status. CPS module 10 automatically confirms the route status when vehicle reaches the scheduled locations (i.e. pickup location, stops, client destination or in-bound garage). Alternatively, the chauffeur can manually confirm the status or confirm the status by voice input by a microphone if needed. Every time route status changes (e.g. from garage out to pick up arrival or route started) CPS module 10 triggers the backend system to stamp the time and save the GPS location for the status change. After the service is completed, every important step in the route is recorded. CPS 10 also provides a set of Mobile Kiosk functionalities, which can automatically log tolls, fees and can manually log extra passengers, requested stops and passenger rating/feedbacks. Most importantly, CPS 10 includes a sync service module 23 which may be a Microsoft® sync service, and a chauffeur route assistant module 24 which provides chauffeurs with turn by turn directions (via both graphical user interface and audio speeches delivered by a speaker) to the pick-up location or passengers' destinations if requested.

The GPS (Global Positioning System) and Wireless (GWU) module 14 is a hardware unit physically installed inside a service vehicle. This device provides key data about the vehicle, which includes, but is not limited to, ignition On/Off status, real-time vehicle location, real-time vehicle mileage, vehicle speed, vehicle direction, gasoline gauge reading, tire-pressure reading, engine diagnostics reading, maintenance data reading and theft protection features. In one embodiment, the GWU subsystem includes three components, as illustrated in FIG. 2. The first component is a GPS unit 25 which calculates the vehicle's GPS coordinates (longitude and latitude) using signals from GPS satellite 26 in a known manner. This unit also calculates vehicle direction (i.e. heading south, or north etc.) and vehicle speed. The update rate can be up to every 1 minute. This information is provided to BOS 15 at scheduled times.

The second component of the GWU 14 is a vehicle data collection unit 28, which is hotwired with vehicle's central computer system. It can read vehicle mileage, gasoline gauge, tire pressure (if equipped) and vehicle diagnostics data in real time. These data are critical for updating maintenance record, scheduling next maintenance, finding potential problems and reporting misconducts.

The third component of GWU 14 is a wireless communication unit 30, which is responsible for sending out the important data collected from GPS unit 25 and vehicle data unit 28 to a local wireless carrier's backend server 32. The data is retrieved by Backend Office System (BOS) 15 as needed. This unit also accepts text messages for configuring the GPS and vehicle data collection units and for theft protection features including forced engine off (if the vehicle's central computer system supports this feature).

GPS data and vehicle data are tracked and recorded periodically (based on the refresh rate setting, which may be up to every minute). These data are sent to BOS system 15 (along with time stampings collected via CPS) to generate maintenance reports/request, billing statements, payrolls, waybills and so on.

Figure 3:
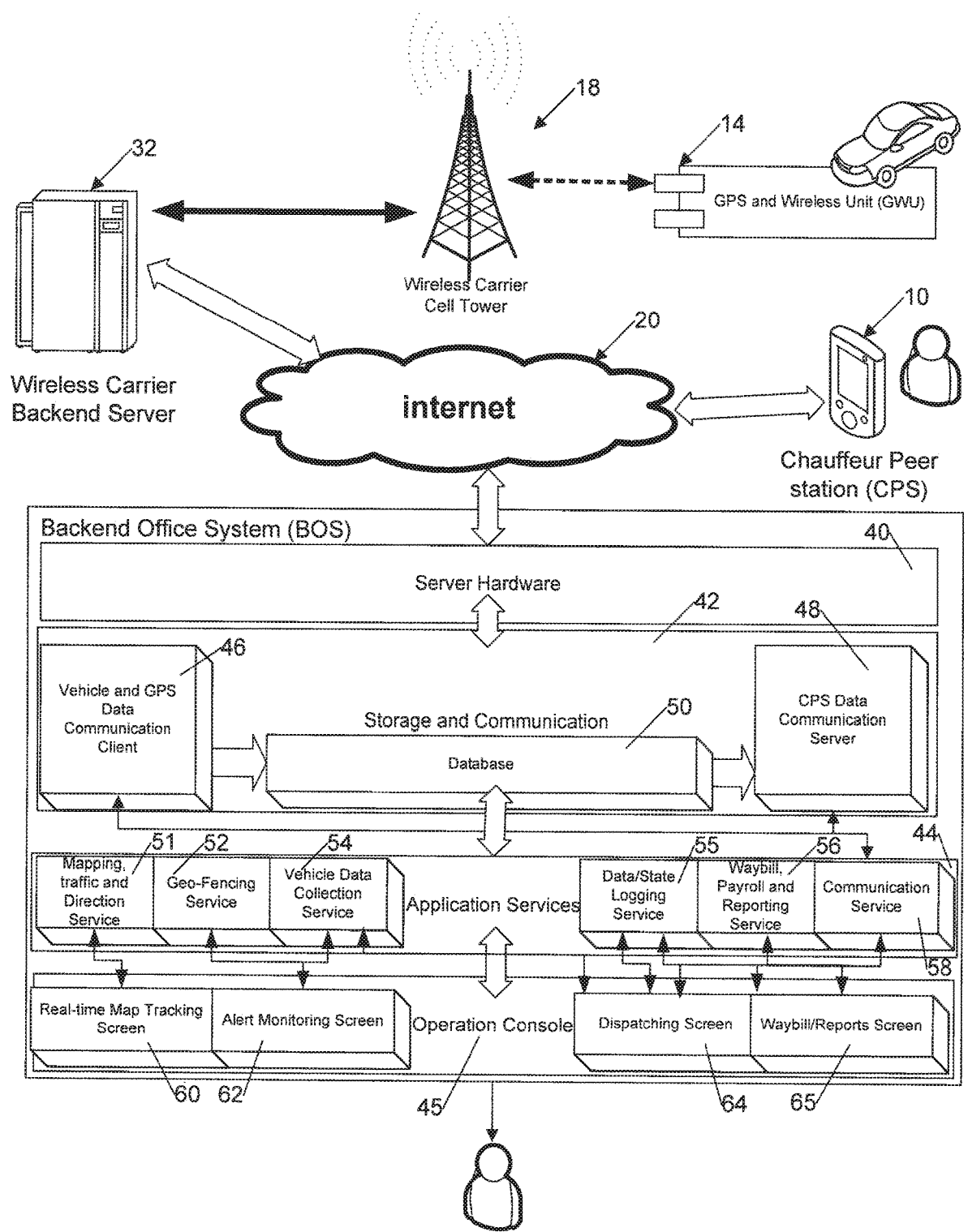
FIG. 3 is a more detailed block diagram of the back end office system or control system of FIGS. 1 and 2.
Figure 3A:
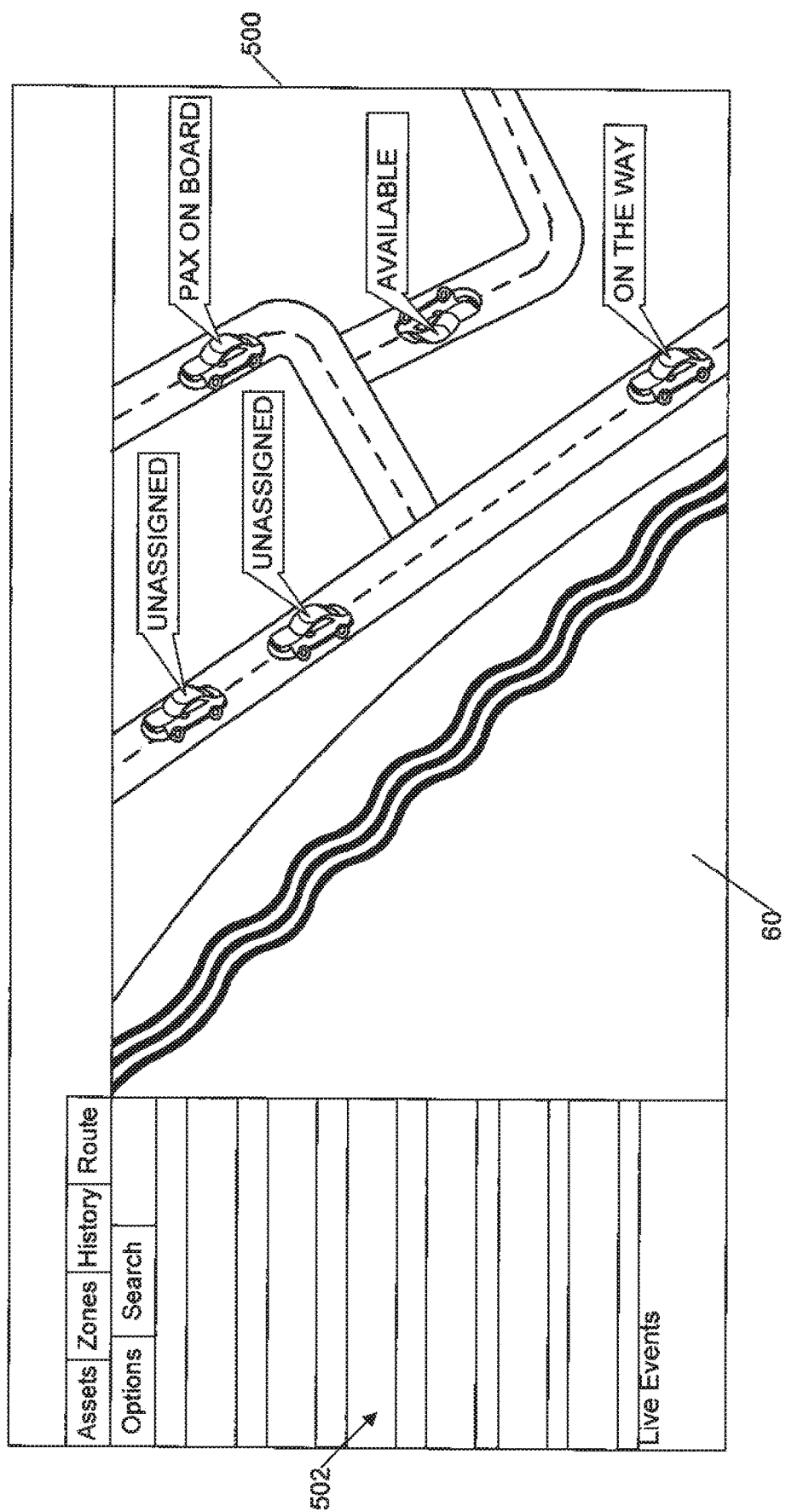
FIG. 3A is an operator interface screen displayed on a display device at the back end office system for operator tracking of current fleet status and other data.

The backend office system (BOS) module or subsystem 15 is illustrated in more detail in FIG. 3, and provides a user interface for fleet live (real-time) map tracking, fleet status monitoring, service delay alerts, vehicle malfunction/misconduct alerts, geo-fencing alerts and service re-scheduling/re-dispatching in case of emergencies (see FIG. 3A). This system may be installed on a local server 34 at data center 16 which is linked to the CPS module over the Internet. BOS 15 has communication interface with CPS devices via the internet, as illustrated in FIGS. 2 and 3, to provide services requested from chauffeurs, for an instance, turn by turn direction guide, traffic updates, route status updates, log timestamps etc. The BOS module 15 is also responsible for getting GPS and vehicle data (in real-time) for each of the vehicles that are currently out on jobs from the wireless carrier's backend server 32, in order to be able to track and monitor the fleet, record status, raise alerts (if any) and generate waybills. BOS has the responsibility to interface with other management systems, so that the GPS and Wireless solution can be integrated with existing management systems seamlessly.

In the embodiment illustrated in FIG. 3, BOS or control system 15 basically comprises server hardware module 40, storage and communication module 42, an application services module 44, and an operation console 45 for receiving commands from an operator 46 and providing data to the operator. Operation console 45 may comprise a touch screen or a display screen and keypad input device. The storage and communication module 42 includes a vehicle and GPS data communication client unit 46 which receives vehicle and GPS data from the GWU module 14, a CPS data communication server unit 48 for receiving communications from the CPS module 10 and sending communications to the module 10, and a data base unit 50 linked to units 46 and 48 which receives and stores data from both modules in connection with each job or trip carried out by vehicles in the fleet.

The application services module 44 comprises a mapping, traffic and direction service module 51, a geo-fencing module 52, a vehicle data collection service module 54, a data/state logging service module 55, a waybill, payroll, and reporting service module 56, and a communication service module 58. The mapping, traffic and direction service module 50 communicates with websites over the Internet in order to receive current traffic delay information, and may communicate with external websites to receive mapping and direction information. Alternatively, mapping and direction software for the area covered by the fleet may be included in the BOS system 15.

Geo-fencing module 52 defines the boundary of the jobs to be assigned at any one location. Geo-fencing areas are defined initially by an operator via a graphic user interface and can be updated anytime. Geo-fencing is used to improve the performance time from receiving the order to dispatch it to the mobile unit. This process is automated by the geo-fencing module. When a job is assigned, the geo-fencing module performs a check to determine whether it extends outside the defined geo-fencing area for the fleet service. If so, a notification is provided to the operator via the operation console. Any jobs assigned beyond the geo-fencing boundary must be justified (by a supervisor or any other senior personnel) and recorded.

Vehicle data collection service module 54 collects and monitors vehicle data on each vehicle in the fleet. When a vehicle is assigned to a job, this module checks the status of the vehicle using the data stored in data base 50 and notifies the operator if there are any areas of concern, such as maintenance due or the like. This module also monitors real time vehicle data received during a trip or job, such as mileage, gas, diagnostics, tire pressure, battery status and the like, and sends an alert to the operator when a potential problem or error is detected.

The data/state logging service module 55 reviews logging as well as vehicle position and status information received real time during a trip, and generates delay alerts which are provided to the operator if the vehicle is delayed or is detected to be not moving or off route.

Waybill, payroll, and reporting service module 56 generates various business and statistical reports based on information gathered on all vehicles in the fleet. The reports include billing statements, payroll reports, vehicle maintenance reports, customer rating/feedback reports, and the like. Communication service module 58 provides communication between the operator and the chauffeur.

The operation module includes a user interface screen 500 as illustrated in FIG. 3A which includes real time map tracking screen 60 that shows the operator the position of all vehicles dispatched by the operator from the beginning to the end of a job. On the left hand side of screen 500 is an operator interface portion 502 which allows the operator to select from various options such as dispatch vehicle, contact chauffeur, search assets, generate reports, and the like. An alert monitoring screen 62 will pop up on screen 500 to show any alerts generated by the geo-fencing service module 52 (trip outside designated area), vehicle data collection service module 54 (vehicle condition alert, such as low battery, low gas, maintenance overdue, or the like), the data/state logging module 55 (vehicle delay alert, such as unexpected stops, delay in reaching a checkpoint, or the like), or traffic delay alerts for a scheduled trip based on input from the mapping, traffic, and direction service module 51.

A dispatching screen 64 is used by the operator to select vehicles and chauffeurs to dispatch for each job received, and to send instructions to the chauffeurs or drivers for each designated job. Waybill/reports screen 65 is used by the operator to communicate with waybill, payroll and reporting module 56 to generate any desired business or statistical reports.

Figure 4:
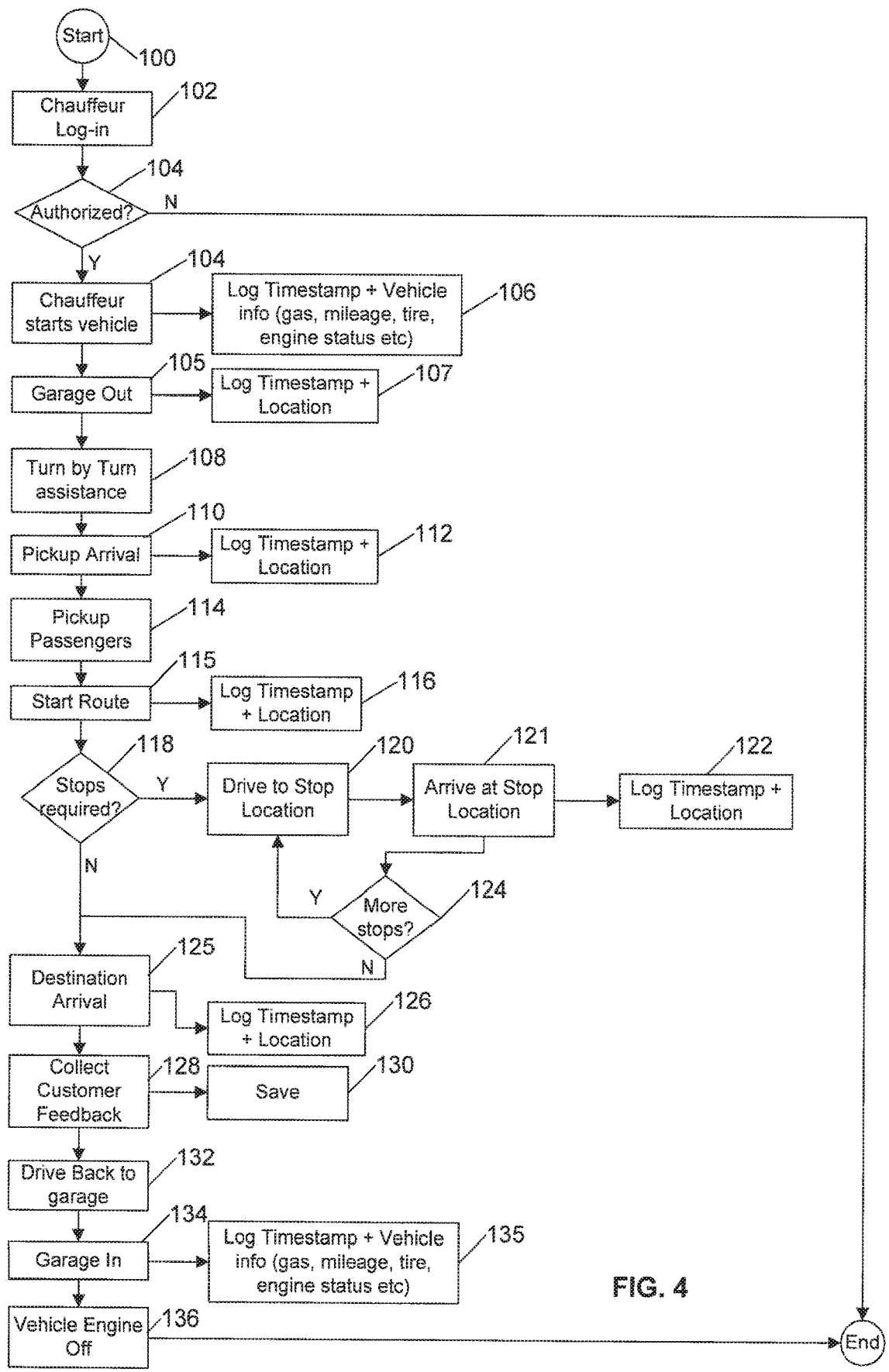
FIG. 4 is a flow diagram illustrating the information collected by the chauffeur peer station during a job.

Operation of the system is described in more detail below with reference to the flow charts of FIGS. 4 to 7. FIG. 4 illustrates a typical trip sequence. As illustrated in FIG. 4, the system logs job information automatically from the start to the finish of a job or trip. The chauffeur or driver first logs in (100). The BOS system detects the log in and checks the data base to determine if the chauffeur is authorized for the trip (102), and notifies the operator and chauffeur if authorization is not found. If the chauffeur is authorized, the system commences monitoring of the vehicle status via the GWU unit 14 associated with the vehicle, and monitoring and collection of data continues throughout the trip. The vehicle data unit detects when the chauffeur starts the vehicle (104). A delay alert is generated by module 55 if vehicle ignition is not detected within a predetermined time period after ignition. The system logs ignition on when a chauffeur starts the vehicle and also logs the time when the chauffeur leaves the garage (105). At each of these log points, a timestamp is stored (106 and 107), and vehicle information is also downloaded and stored, such as gas mileage, engine status, tire status, and the like. This information is monitored by modules 54 and 55 and alerts are generated if any areas of concern are detected, such as unexpected delay or unacceptable vehicle status. This information is also used in monitoring fleet vehicle status to determine when vehicles should be scheduled for service and the like. Location information is also stored along with the garage out timestamp, at step 107. During a trip, a driver can request turn by turn assistance (108), which is provided by voice commands in one embodiment, as illustrated in more detail in FIG. 7, so that the driver does not have to direct their attention away from the road.

Arrival at a pickup location (110) is also logged automatically with a timestamp and detected GPS location (112), and this data is stored as part of the job information. Data/state logging service module generates delay alerts and the like if the vehicle is detected to be late arriving at the pickup location, so that the operator can take additional steps such as contacting the driver for explanation of the delay, and contacting the customer to notify them that the driver has been delayed. After picking up one or more passengers (114), the vehicle is re-started, and the start of the route (115) is then logged with timestamp and location (116). If any stops are required during the trip (118), the chauffeur drives to the stop location (120), arrives at the location (121), and a log of the timestamp and stop location is created (122). If no more stops are needed (124), the chauffeur continues to the destination (125). On arrival at the destination, a timestamp and location log is created (126). The chauffeur may also collect customer feedback at this time (128), and any collected information is stored (130). This information may later be used in generating customer feedback reports. After dropping off the passenger, the driver returns to the garage (132). On entering the garage (134), a timestamp is logged (135), and vehicle information such as gas, mileage, tire, engine status, and the like is also collected, stored, and processed. A timestamp is also logged when the engine is turned off (136).

Each of the timestamp and location logs may be created automatically on detection of vehicle status, or may be initiated by the chauffeur by voice command or actuation of a control. Based on the precise logging from the start to the end of a trip, a chauffeur's time sheet is generated by the report generating module and recorded automatically for payroll processing by module 56. A bill may also be generated based on the length of the trip and any intermediate stops.

The BOS subsystem collects all the information from each of the vehicles in the fleet in real-time. It knows which vehicle is on what job at any given time. A pre-emptive delay alert is set by the system for each of the scheduled job/routes. Alerts may be generated by any of the monitoring modules 51, 52, 54 and 55 during each trip. When the chauffeur who is on the job doesn't leave the garage on the scheduled time or doesn't reach predefined checkpoints, an alert is raised automatically by service module 55 and sent to the responsible operator, who then checks on that incident. A backup chauffeur (who is near by) can be sent to cover the emergency if necessary. Similarly, traffic delay alerts may be generated by module 51 and provided to both the operator and chauffeur, allowing alternative routes to be determined in order to avoid any traffic hold-ups. Geo-fencing alerts are generated if a driver is detected to be outside the designated service area. Finally, vehicle status alerts are generated if a vehicle problem is detected based on information received from the vehicle data unit in GWU module 14.

Figure 5:
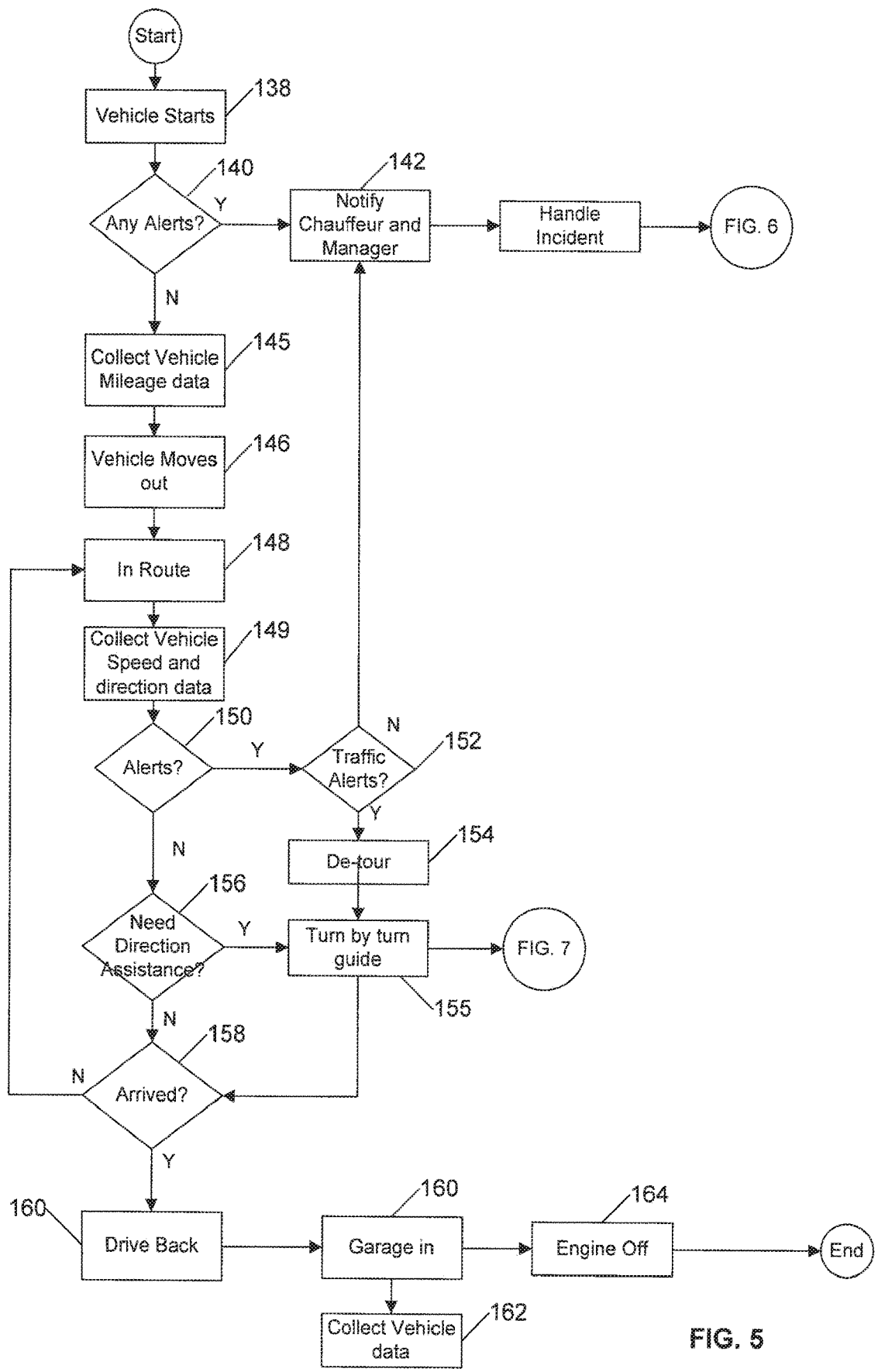
FIG. 5 is a flow diagram illustrating vehicle tracking information collected during a job.

The alert system is illustrated in more detail in FIG. 5. As noted above, a pre-emptive delay alert is set for each scheduled job or trip. Other alerts which may be stored or detected by the system are vehicle maintenance alerts, traffic delay alerts, and geo-fencing alerts, as described above. Once the trip starts (138), the system checks for any alerts (140) and notifies the chauffeur and manager or operator if any alerts are detected (142). The alert is handled appropriately based on type (144), as illustrated in more detail in FIG. 6. The system continues to monitor for alerts throughout the trip. If no alerts are detected at the start of the trip, mileage and vehicle data is collected (145), and the vehicle moves out of the garage (146). Once the vehicle is en route (148), the system collects vehicle speed and direction data (149) and monitors for all types of alerts (150). Vehicle data is also collected at predetermined intervals, such as the minute intervals, throughout the trip. Alerts may be generated during the trip, for example, if the vehicle stops while en route or if the vehicle is traveling in the wrong direction, fails to reach a predetermined checkpoint by an assigned time, and include traffic alerts (152) based on detected traffic hold ups by mapping, traffic and direction service module 51, for example as a result of input from traffic monitoring websites. If any alert is detected, the chauffeur and manager are informed (142), and the situation is handled as appropriate. If the alert is a traffic alert, a detour or alternative route may be generated by the traffic and direction service module (154) and the driver may be provided with turn by turn directions for the detour (155). A turn by turn guide is also provided if direction assistance is requested by the driver (156). After arrival at the location (158), the driver returns to the garage (160), vehicle data is collected (162), and the engine is turned off (164).

Figure 6:
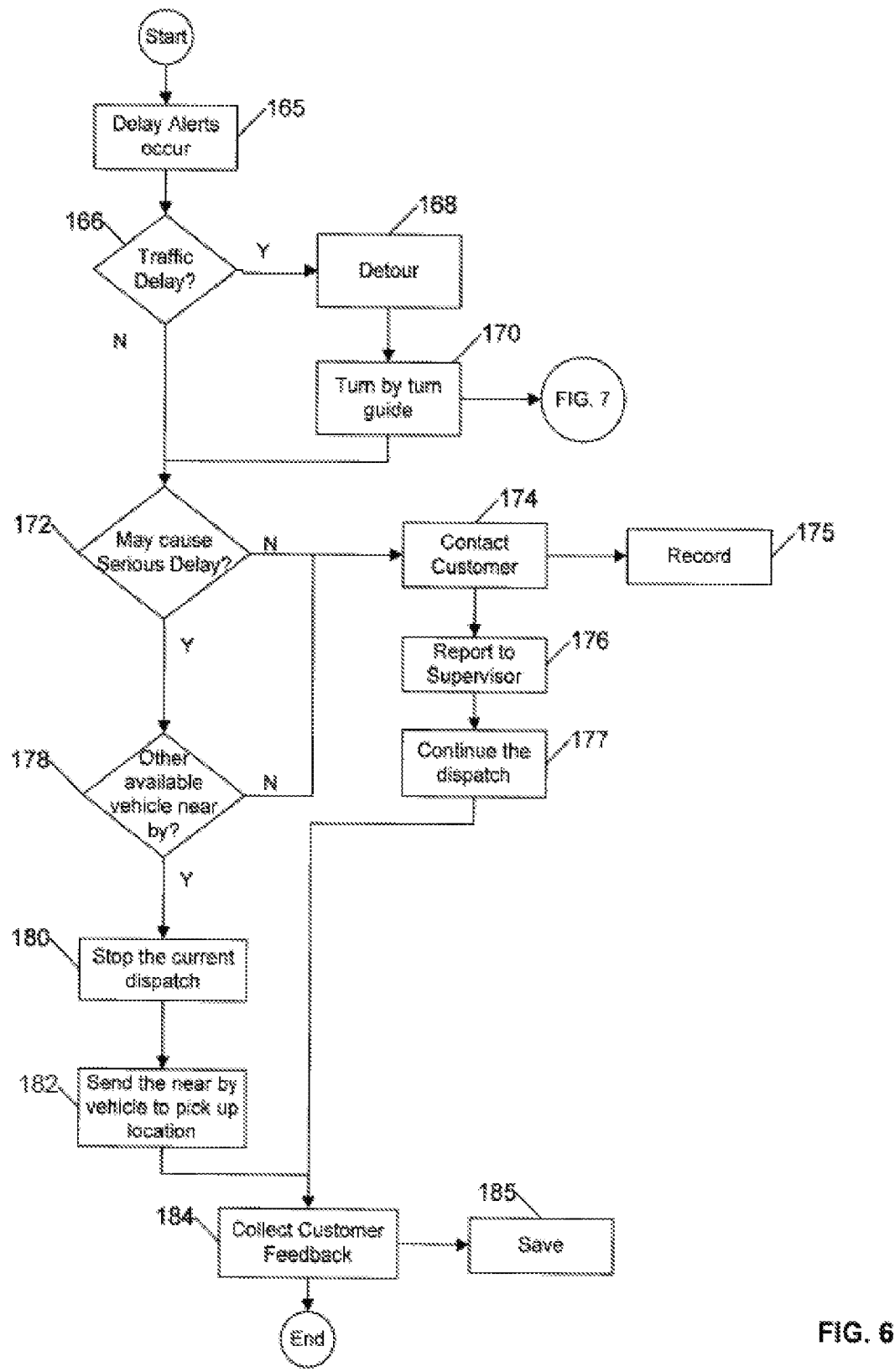
FIG. 6 is a flow diagram illustrating handling of an emergency.

A more detailed block diagram of a delay alert or emergency is illustrated in FIG. 6. When a delay or potential delay alert of any type is generated by module 51, 52, 54 or 55, the system first determines whether it is a traffic delay (166). Alerts may be generated automatically based on scheduled maintenance, malfunctions of vehicles, abuse of vehicles, deviation of planned routes, lease expirations and mileage expirations, as well as traffic delays. If a traffic delay is detected, a detour is generated (168), and the driver is provided with turn by turn instructions (170). When another type of delay alert is generated, the system or authorized operator needs to determine whether a serious delay is involved (172). This can be done by reviewing the alert information or asking the driver for the cause of the delay, for example. If the delay is not serious, the customer is contacted (174) and informed that the vehicle may be a few minutes late, and the event information is recorded (175). A report is made to the supervisor (176), and the job is continued (177). If the delay is serious, for example an accident or vehicle breakdown, the system determines whether there is another vehicle available nearby (178). If so, the current dispatch is stopped and the vehicle is instructed to return to the garage when possible (180). At the same time, the nearby vehicle is sent to the pick up location (182). If there is no nearby vehicle, the customer is informed. Customer feedback may be obtained and stored (184, 185) at the end of the job.

Figure 7:
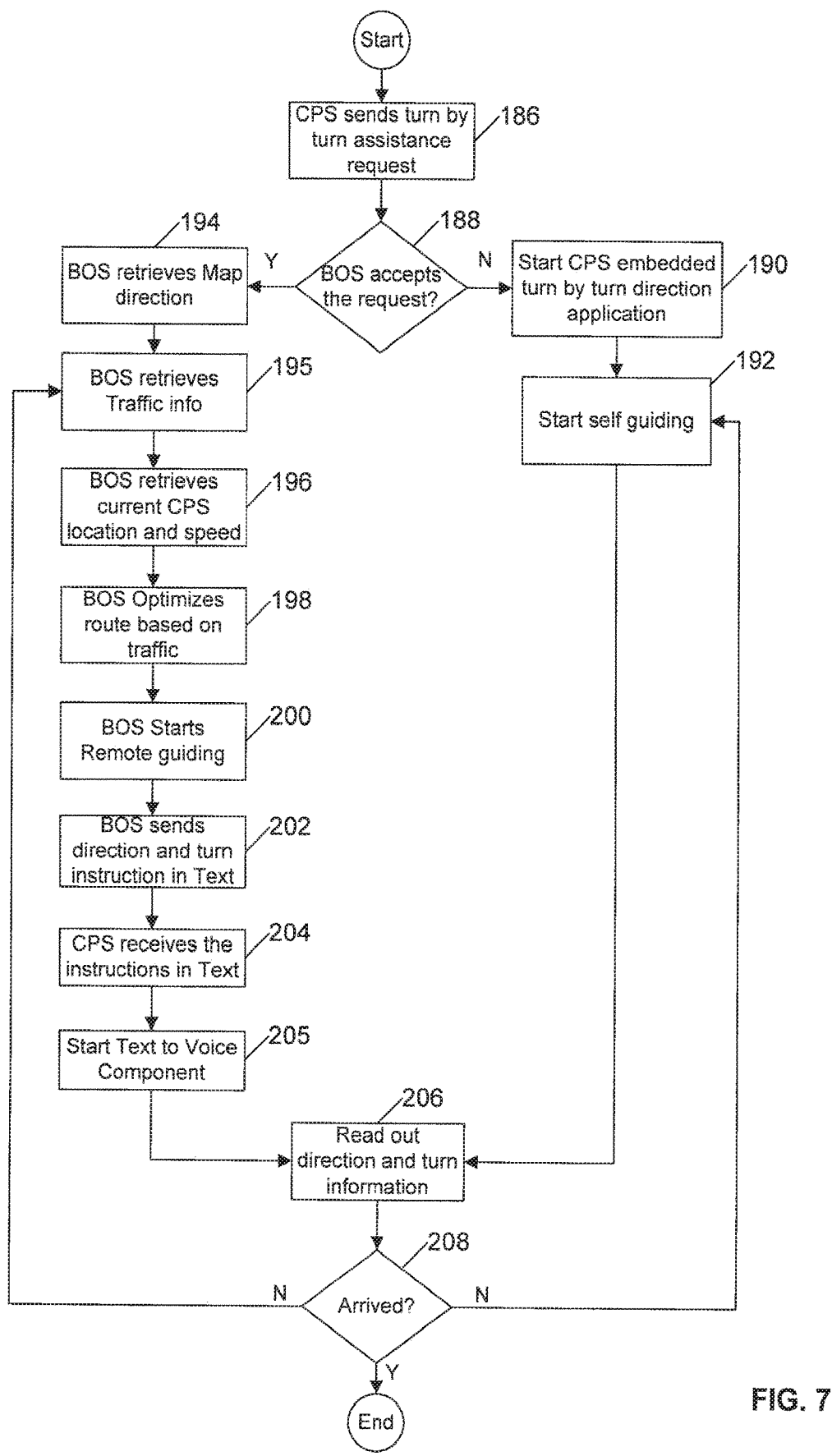
FIG. 7 is a flow diagram illustrating the turn-by-turn voice assistance option.

FIG. 7 is a flow diagram illustrating the turn by turn assistance option in more detail. This may be provided to a driver on request for any trip, and also when a detour is needed due to traffic delay, customer request, or the like. If a driver requires direction assistance, either for the scheduled trip or when a detour is needed, they input the request in CPS module 10, and the request is sent to the operator (186). If the BOS 15 rejects the request for some reason (188), the CPS module initiates an embedded turn-by-turn application (190) and starts self-guiding (192) using software similar to that provided in many on vehicle direction systems. In one embodiment, the CPS module includes a text to voice component which converts text instructions into a voice output, so that the driver does not have to look at a screen to receive directions, but instead receives them by voice output. This allows the driver to keep their eyes on the road at all times.

If the BOS accepts the request for directions at step 188, the mapping, traffic and direction service module 51 retrieves map direction information for the trip (194), and also retrieves traffic information (195) in order to detect any traffic delays and arrange for a detour if needed. At the same time, vehicle data collection service module 54 retrieves the current vehicle location and speed from GWU module 14 (step 196). The direction service module utilizes the retrieved data in order to optimize the route from the vehicle's current location based on traffic information (198). The direction service module also starts a remote guiding sequence (200), and sends directions and turn by turn instructions in text to the CPS module 10 (step 202). The CPS module 10 receives the instructions in text (204), and starts the text to voice component (step 205), which converts the text instructions into a voice output and reads out the directions and turn information (206) on a turn-by-turn basis using updated information on current vehicle location so as to time the instructions to the vehicle's movement along the route. The instructions stop on arrival at the location (208).

With the above system, vehicle data is collected periodically in real time from the vehicle's onboard computer and stored in the data base at the BOS 15. This data includes mileage, gas, diagnostics, tire pressure, battery status and the like. The vehicle data is used to generate vehicle maintenance reports for business owners and to track the maintenance record as needed. Scheduled maintenance, malfunctions of vehicles, abuse of vehicles, deviation of planned routes, lease expirations and mileage expirations can trigger alerts to be sent to the personnel responsible for the particular incident or vehicle.

In one embodiment, the CPS provides voice commands allowing the chauffeur to communicate with BOS or any representatives if needed. Turn by turn direction is also provided via voice. CPS information logging can be done automatically (by default) without requiring the chauffeur to intervene. This allows the chauffeur to focus on the road instead of on the phone or other controls, and may improve safety.

The real-time vehicle data collection on every move of every vehicle in the fleet allows the vehicles' movements to be tracked and monitored in real time. This helps a chauffeur to complete services with high customer satisfaction. This also allows the status of vehicles in the fleet to be tracked and monitored continuously so that the fleet's maintenance records can be maintained and potential misconducts or accidents can be avoided, and also allows jobs to be assigned to vehicles more efficiently.

Since every move of every vehicle on any job is logged with a precise timestamp, the complete waybill record regarding each service job is generated automatically when the service ends and the chauffeur returns to the garage. The electronic waybill with all the detailed/required information is used for billing and payroll processing without any manual process. Therefore no mistake is made and billing and wage/payroll can be automated and processed in quickly and efficiently.

In one embodiment, geo-fencing areas are set according to county boundary, city boundary, zip code boundary, and even phone number area code boundary. Crossing boundary job dispatch is disallowed unless justified by supervisors. Geo-fencing areas and enforcement rules can be modified by authorized personnel and changes take effect right away.

The CPS subsystem used by the chauffeur provides automated confirmation on route status change. Chauffeurs do not need to manually confirm route status changes like garage out, garage in, pickup arrival, destination arrival, and the like, because the CPS subsystem or module automatically confirms the status based on the calculation of vehicle locations and movements. This not only increases the accuracy of the vehicle status for monitoring and recording, but also improves driving safety.

The above system provides real-time and full scale service/route tracking, automatic billing and payroll, vehicle status monitoring, status updates, real-time vehicle data inspection, and pre-emptive delay alerts and Geo-Fencing alerts. An integrated voice command system further adds to the ease of use of the system.

Figure 8:
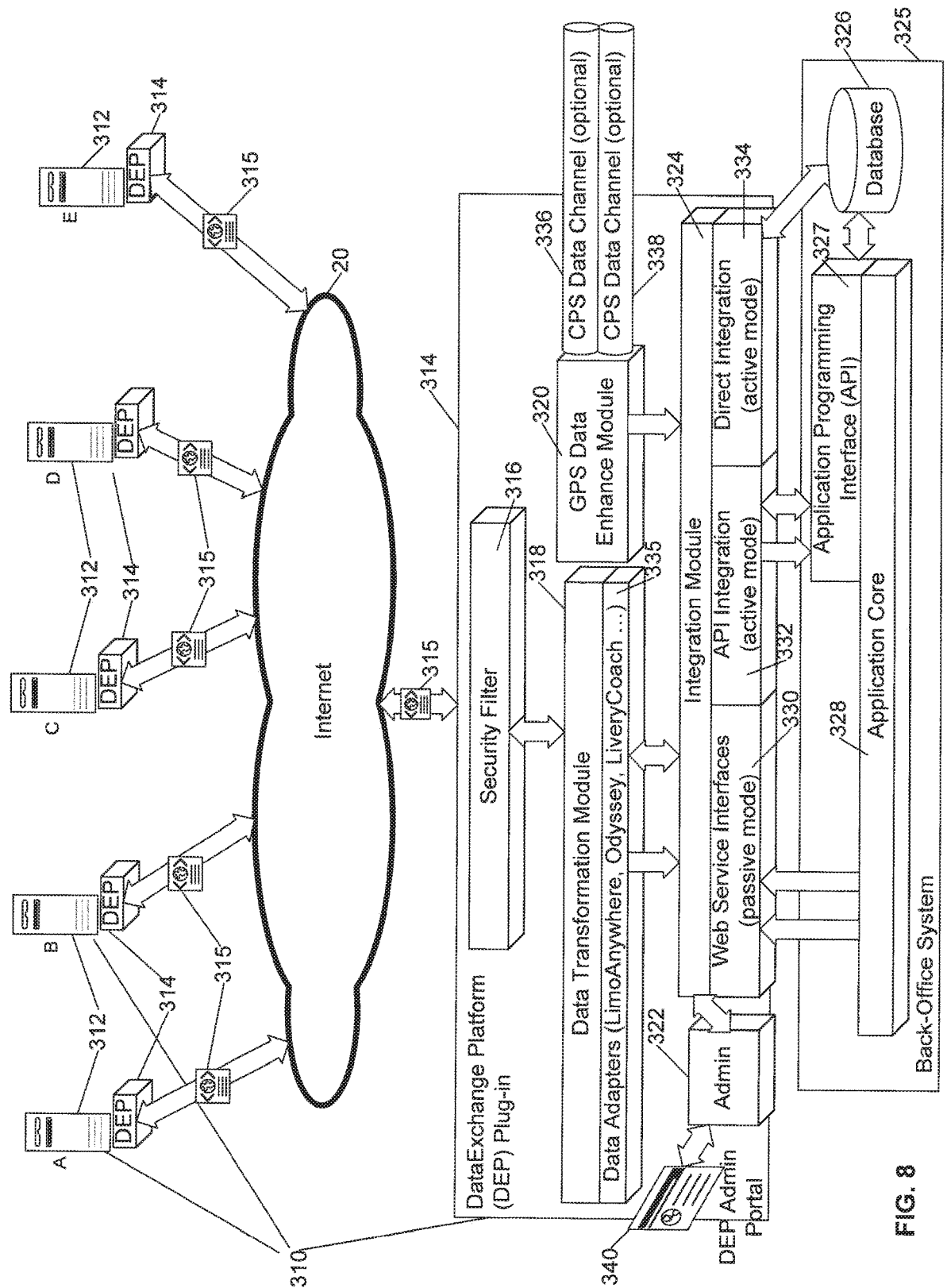
FIG. 8 is a block diagram of an embodiment of a data exchange system for use in fleet management.
Figure 9:
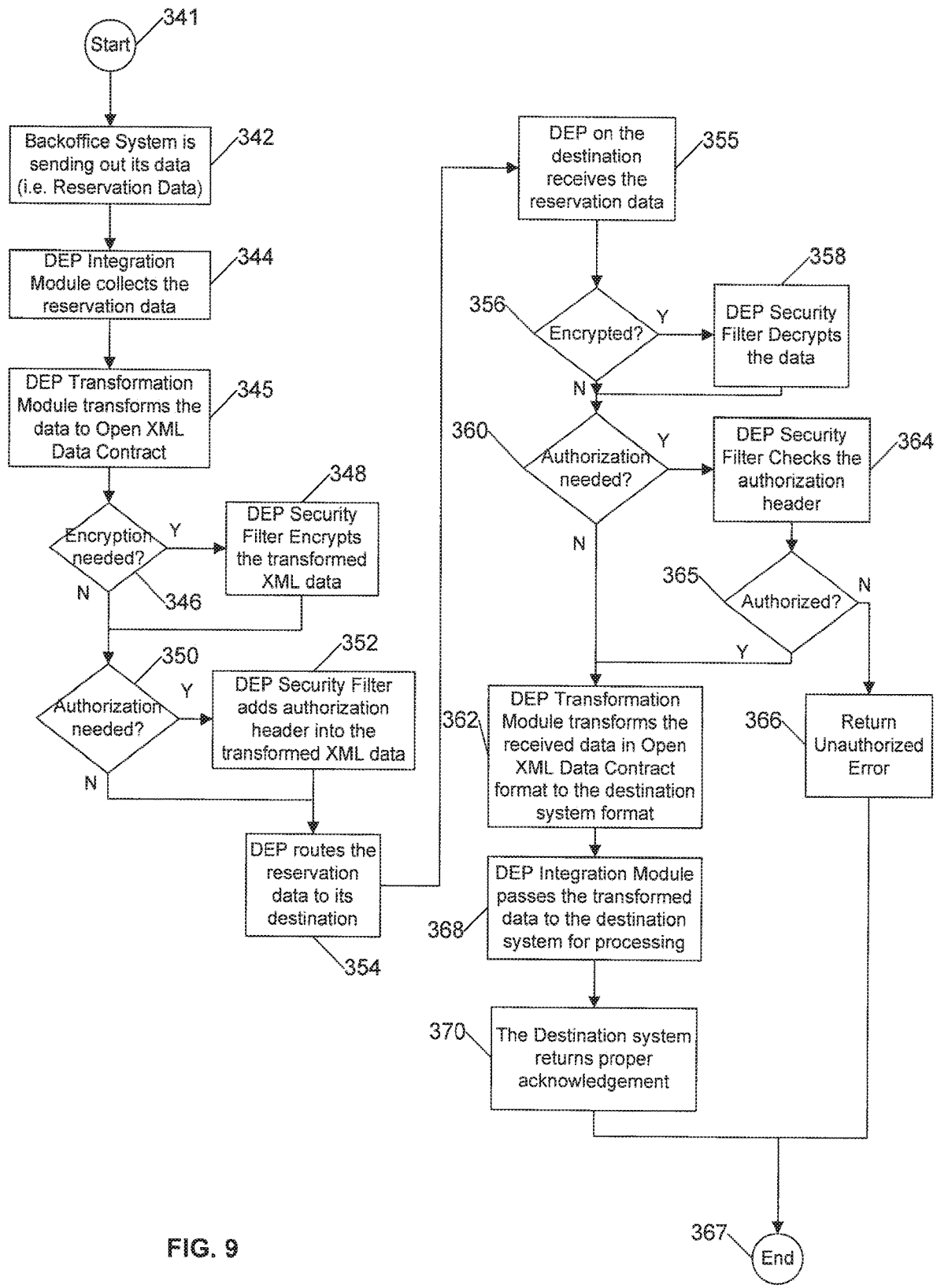
FIG. 9 is a flow diagram illustrating operation of the data exchange system of FIG. 8.

FIGS. 8 and 9 illustrate one embodiment of a fleet network data exchange system and method which may be integrated with the fleet management system of FIGS. 1 to 7 as described below in connection with FIG. 10, or which may be a stand-alone system which allows sharing and exchange of data between multiple transportation company affiliates. This system can connect multiple affiliated transportation companies such as taxi services, limousine services and the like together to share information across large geographical areas, or even worldwide to other countries, and to link them all to potential clients. In this way, if one affiliate receives a reservation it cannot fill, due to lack of an available vehicle in the area, the reservation can easily be forwarded to the next closest affiliate with availability. In this way, the reservation is seamlessly dispatched to the closest available vehicle to the requested location. This improves efficiency of using the asset and create better customer service. Alternatively, a single company in the group can be designated as the central reservations office which receives reservations and dispatches them to the appropriate affiliate having an available vehicle in the vicinity.

In the system of FIG. 8, a plurality of transportation providers or affiliates 310 such as taxi companies, limousine companies, or the like communicate over one or more networks such as the Internet 20 for sharing information and receiving reservations for dispatching purposes. Each affiliate 310 has one or more servers 312 which include a back-office system 325. Each back office system communicates with the rest of the system over the Internet via a data exchange platform (DEP) or plug and play platform 314. In one embodiment, the DEP is a downloadable, plug-in component which may be added to the back-office system of each affiliate. Each DEP communicates with affiliated DEPs using a suitable universal or open standard communication language used to share information between different systems, such as open extensible mark-up language (XML) data contracts 315, as indicated in FIG. 8. Each data exchange platform (DEP) 314 runs as a web service server to transform, send out, and receive data for its back-office system 325. The DEP uses standard communication protocols such as hyper text transfer protocol (HTTP) or HTTP secure sockets layer (HTTPS) to transmit data, and applies industry standards for web service addressing, security, transfer, secure conversation, metadata exchange, and the like.

Each DEP 314 comprises a security filter 316 through which network communications are filtered, a data transformation module 318, a GPS data enhance module 320, an administration module 322, and an integration module 324. The DEP 314 is downloaded to an affiliate's back-office system 325 which includes one or more data bases 326 for storing fleet vehicle data, chauffeur data, customer data, reservations data, billing data, affiliate data, and the like. System 325 also includes an application programming interface 327 and an application core 328, and may include some or all of the components illustrated in the back end office system of FIG. 3.

The DEP integration module 324 has three types of integration with back office system 325. A web service interface 330 provides an interface for sending out back-office data such as reservations, client information, reservation changes, and the like, to a particular affiliate or group of affiliates, regardless of the types of back-office system used by the affiliates. This interface also provides an interface for incoming information from other affiliates, such as reservations dispatched to the back office system 325 from another affiliate. This interface may be designed to distribute XML based simple object access protocol (SOAP) messages via HTTP/HTTPS connections. Once it has subscribed with the affiliate network, the back office system is informed whenever data is delivered to the system. An API integration module 332 allows the DEP to actively call the back office system to send out or receive data among affiliates or networks. This can be used if the back office has communication APIs allowing third party calls. A direct integration module 334 is used to allow the DEP to read or write data directly to the back office data base The data transformation module 318 has data adapters 335 to transform or translate back and forth between the home system-dependent (back office dependent) data structure and open XML data contract to allow communications with other affiliates which may be using different back office systems. For example, outgoing data from the back office system of affiliate A in FIG. 8 is in the proprietary structure/format of affiliate A. This is transformed into open XML data contract format, and then sent to another affiliate, such as affiliate C. The DEP at affiliate C receives the data in open XML data contract format and transforms it to the affiliate C data format, then transfers it to the back office system of affiliate C for further processing. This allows affiliate A and affiliate C (or any other combination of affiliates 10) to talk to each other seamlessly.

The GPS data enhance module 320 is an optional subsystem in the DEP which is designed to communicate with the GWU 14 described above in connection with FIGS. 1 to 7 so as to receive data from that system, as described in more detail below in connection with FIG. 10. The GPS data enhance module basically uses the DEP plug and play platform to provide GWU communication capability for other back office systems, and is a GPS data communication client that gets GPS data from the wireless data center 16 of FIG. 1. The GPS data enhance module has a CPS data channel 336 to receive status information from the CPS modules of FIGS. 1 to 7, and a client endpoint station (CES) data channel 338 which receives status information from a CES or end user mobile portal, as described below in connection with FIGS. 10 to 15. This provides data updates on vehicle tracking, billing, alerts, geo-fencing, and the like.

The DEP administration module 322 provides an administration web portal 340 to allow system administrators to manage data transformation and security during data exchange between heterogeneous back office systems of different affiliates. The following settings may be managed via this web portal:
1. Data structure, including data fields, data types, type mappings, alias, and the like.
2. Version control, which resolves compatibility issues.
3. Data security, including encryption, authentication, authorization, and data alerts including data integrity check, data sensitivity check, data priority check, and the like.

The security filter 316 blocks sensitive data to be sent out and adds security thumbprints to data, such as digital signatures, encryption, authorization marks, and the like, based on security policy which may be set through the DEP administration portal 340/module 322.

FIG. 9 is a flow diagram illustrating operation of the data exchange portals 314 in the system of FIG. 8. At the start 341 of a data exchange, a back office system 325 of one of the affiliates (say affiliate A) which is acting as a source sends out data, such as reservation data (step 342). The integration module 324 of the DEP 314 associated with affiliate A's back office system collects the reservation data (step 344) and transmits it to the transformation module 18, which transforms the data into a suitable open universal language such as open XML data contract (step 345). At step 346, the system determines whether encryption is needed (based on standards set by the system administrator). If encryption is needed, the DEP security filter 316 encrypts the transformed XML data (step 348). At step 350, the system determines whether authorization is needed. If so, the DEP security filter adds an authorization header into the transformed XML data (step 352). The reservation data is then routed to the destination (step 354). The destination may be another affiliate or a group of affiliates, based on geography, cost, or other criteria. The DEP 314 at the destination affiliate receives the reservation data (step 355), and first determines whether it is encrypted (step 356). If the data is encrypted, the DEP security filter 316 decrypts the data (step 358). The DEP then determines whether authorization is needed (step 360). If not, the communication is sent to the DEP transformation module at step 62. If authorization is needed at step 360, the DEP security filter investigates authorization of the communication (step 364). If the security filter determines that the authorization is valid at step 365, the communication is sent to the DEP transformation module (step 362). If the communication is found to be unauthorized at step 365, an unauthorized error is returned to the source DEP (366), and the process ends (367).

At step 362, the DEP transformation module 318 at the destination affiliate transforms the data received in open XML data contract into the destination back office system format, and the transformed data is passed on to the DEP integration module 324, which passes the transformed data to the destination back office system for processing (step 368). The back office system sends the data for appropriate processing and returns a proper acknowledgement to the source affiliate (step 370) and the process ends (367). Processing of the data at the destination back office system may include storing the reservation information and initiating dispatch of a vehicle to pick up the client at the appropriate time and place.

Figure 10:
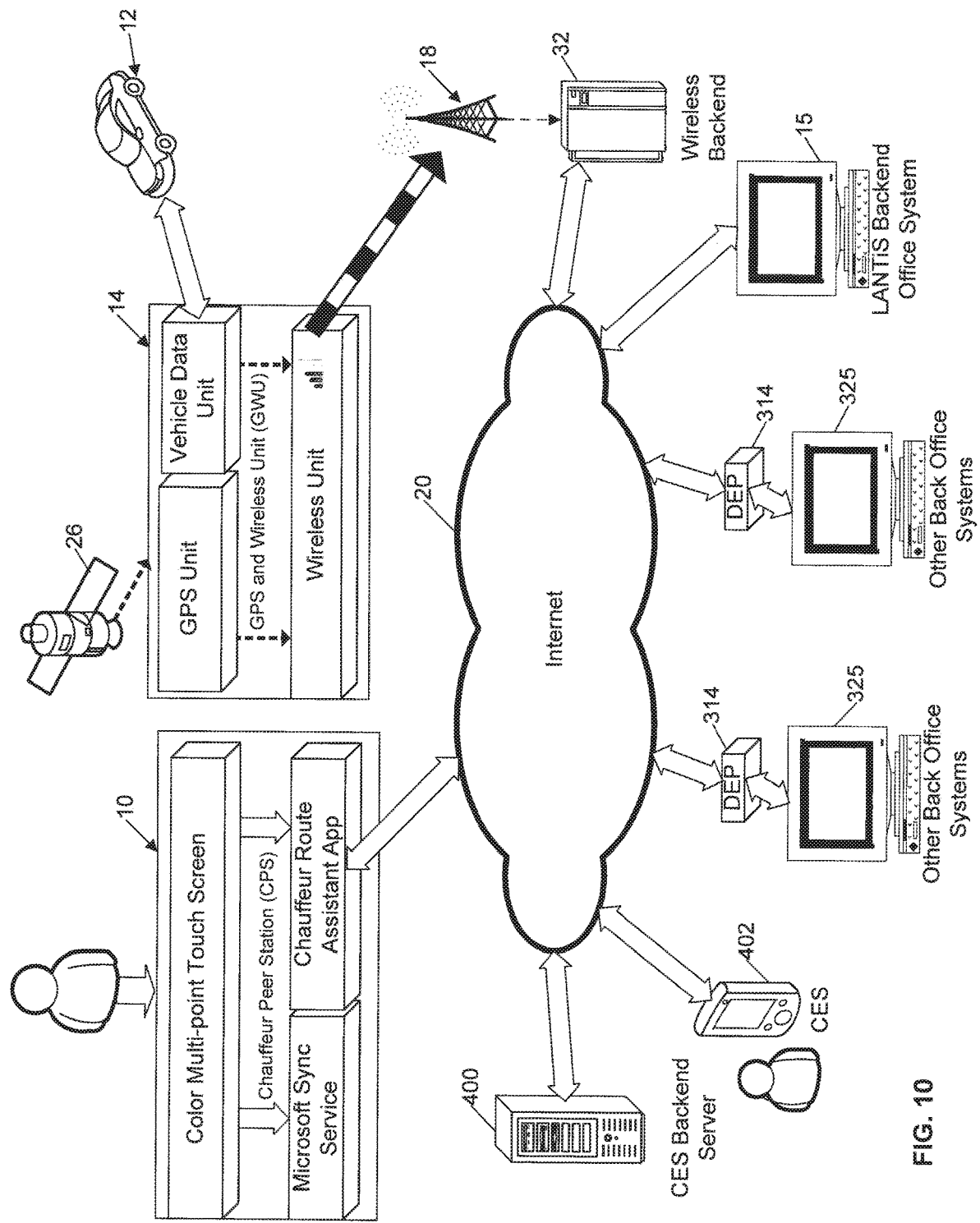
FIG. 10 is a schematic diagram illustrating another embodiment of a fleet management system including the components of FIG. 1 as well as the data exchange system of FIG. 8 and a client end service (CES) system.

FIG. 10 illustrates a modified fleet management system which includes the components of the system of FIGS. 1 to 7 and also includes back office systems incorporating the DEP module of FIGS. 8 and 9, a client endpoint station or CBS backend server 400, and a plurality of CES end user mobile portals 404 (FIG. 11) installed on end user devices 402 such as mobile phones, portable digital assistants, laptop computers or mini computers, and the like. In addition to backend office systems 15 which incorporate the fleet management system described above in connection with FIGS. 1 to 7, this system allows other back office systems not adapted for communication with the fleet management system to receive data from GWU modules 14 installed in their fleet of vehicles, using the DEP of FIGS. 8 and 9 with a GPS data enhance module 320, without having to replace their existing back office system.

The system of FIG. 10 also provides the ability for clients or passengers to access fleet services easily from any location, via the CES system 400, 404. End-User Mobile Portal (EMP) is a free client application that may be downloaded and installed to the subscribers' mobile devices such as mobile phones, portable digital assistants, laptop computers or mini laptop computers, and the like. The supported mobile phones may include iPhones, Blackberries and Microsoft Mobile 6 based smart phones, and the like. The EMP application adds convenience to both frequent clients and occasional emergency-driven clients.

Figure 11:
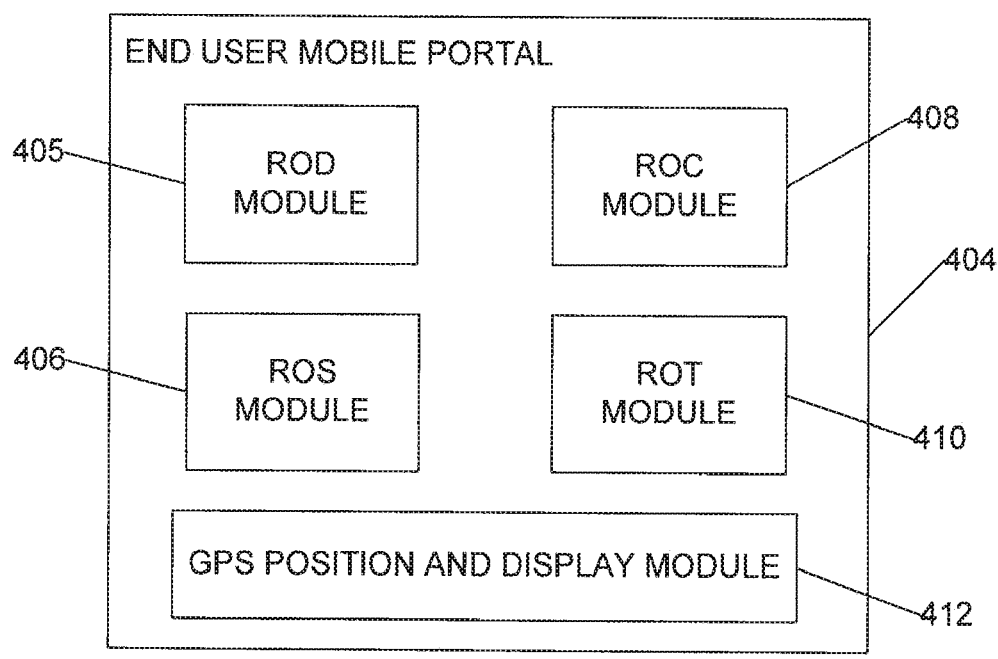
FIG. 11 is a block diagram of the end user mobile portal of the CES system of FIG. 10.

FIG. 11 illustrates the EMP application 404 in more detail, EMP 404 comprises a ride on demand (ROD) module 405, a ride on schedule (ROS) module 406, a ride on call (ROC) module 408, a ride on time (ROT) module 410, and a GPS position and display module 412 which can be used to display a real time vehicle location. With EMP, a client/user can conveniently locate the closest available car and book an emergency ride via Ride-On-Demand (ROD) module 405; schedule a ride via one-click phone call via Ride-On-Call (ROC) module 408, or calendar a pickup via Ride-On-Schedule (ROS) module 406. The EMP application is also provides real time status tracking on a scheduled ride via Ride-On-Time (ROT) module 410. Each module uses the GPS position and display module 412 to display a client's current location as well as other location information depending on the service requested.

Figure 12A:
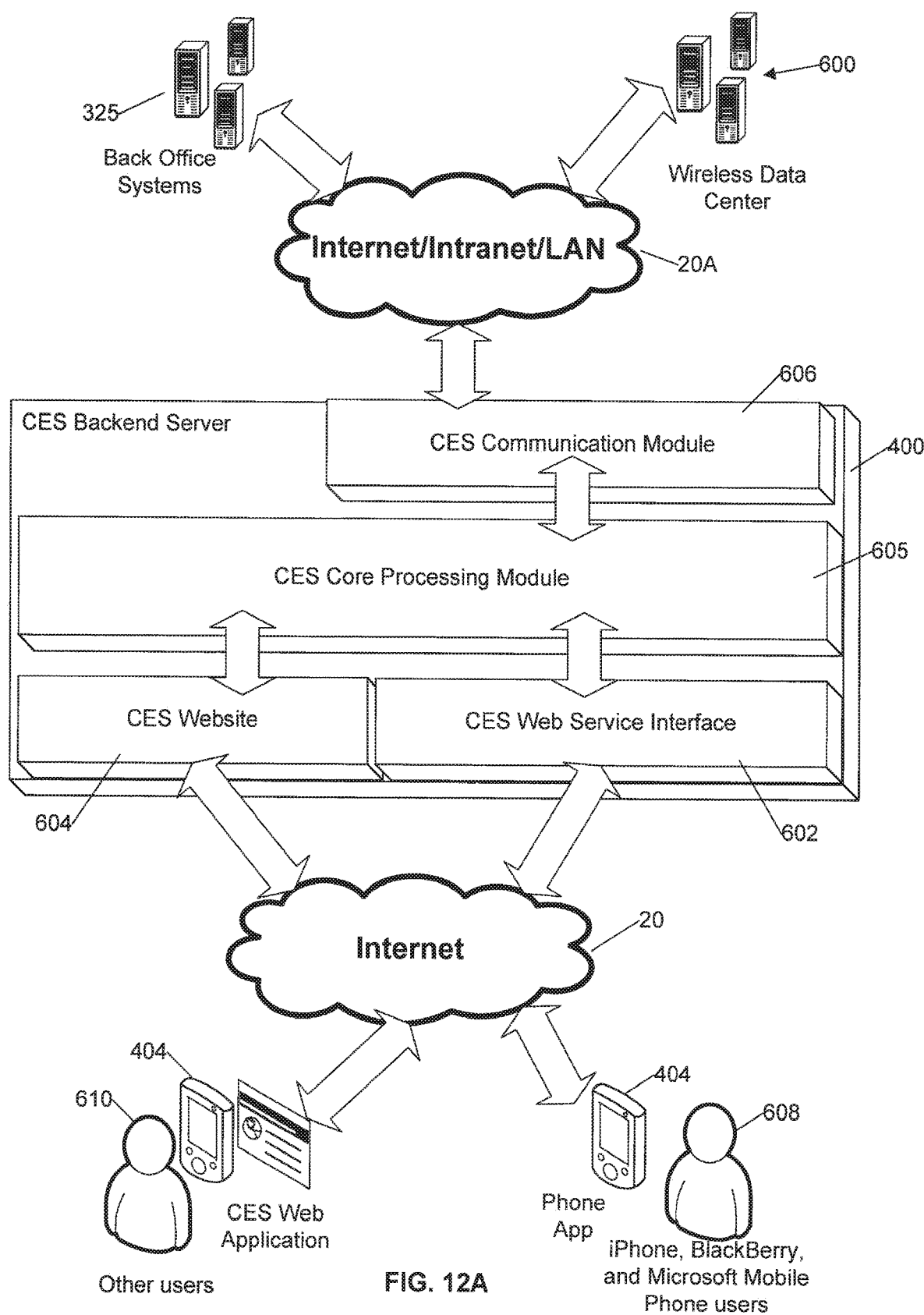
FIG. 12A is a schematic diagram illustrating the CBS backend server of FIG. 10 in a network configuration.
Figure 12B:
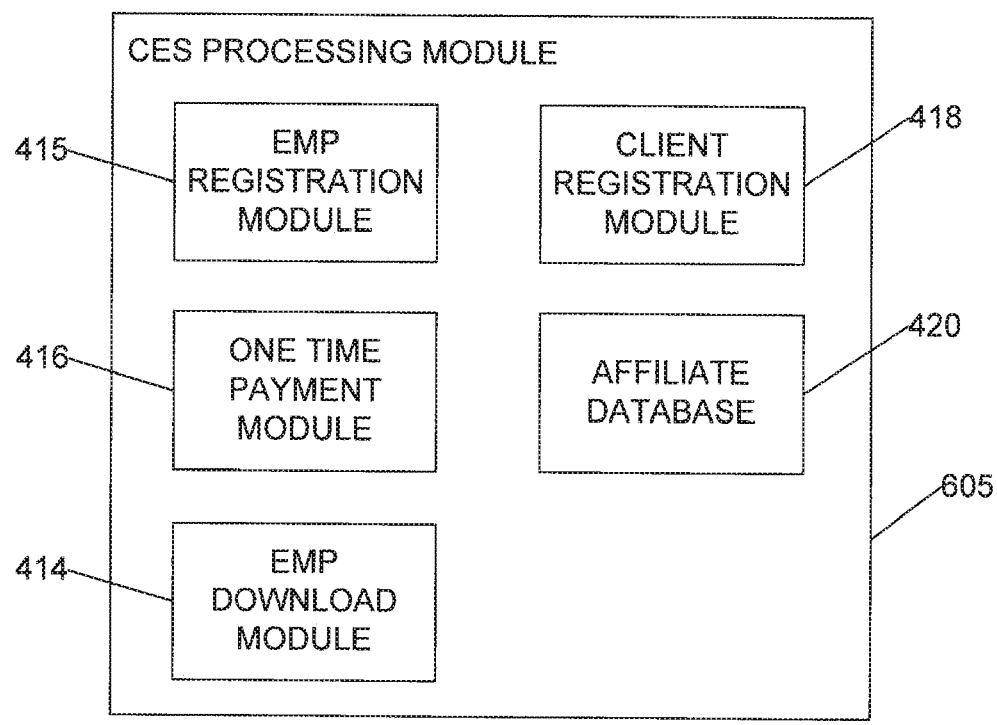
FIG. 12B is a block diagram of the CES processing module of FIG. 12A.

The CES backend server 400 is illustrated in more detail in FIGS. 12A and 12B. The CES backend server 400 may be part of a national dispatch center responsible for dispatching vehicles from affiliated transportation companies in response to requests received from customers via mobile handheld devices 402, using the EMP application. CES backend server 400 is linked to various affiliates' back office systems 325/15 and to wireless data center 600 over one or more networks 20A such as the Internet, a local intranet, and/or a local area network (LAN). The wireless data center 600 receives and stores real time vehicle information from the various in-vehicle GWU modules.

As illustrated in FIG. 11A, the CES back end server communicates with client devices 404 such as mobile devices via phone using CBS web service interface 602, or via Internet web browser using CES website 604. Each of these modules is linked to the CES core processing module 605 illustrated in more detail in FIG. 11B, and the core processing module is linked to CES communication module 606. For users 608 who are using a smart phone or personal digital assistant such as an iPhone®, Blackberry®, or a phone running Microsoft mobile platform, the CES phone application can be downloaded and installed using the mobile smart phone application. The phone application can then be used to place requests, submit confirmations, view real time information, and carry out other features supported by ROD, ROC, ROS and ROT. For users 610 who are using a regular mobile phone which has the capability of browsing a website (or a portable computer or mini-computer), the CES web application can be downloaded and installed from the CES website to provide ROD, ROC, ROS and ROT features. The CES communication module 606 uses web services provided by the back office systems and the wireless data center 600 to retrieve vehicle availability and other affiliate information, as well as real time vehicle location data.

As illustrated in FIG. 12B, the CES processing module includes an EMP download module 414 through which a prospective client for transportation services can request download of the free EMP application 404. Once the EMP application is downloaded, the end user/client can choose to register for ongoing EMP/CES services via EMP registration module 415, or can simply enter their payment information for a one time use without registration, via one time payment module 416. If the client chooses to register for ongoing services, the CES server obtains and stores registration information such as payment method/billing information, home locations, frequent pick up locations, and contact information in the registered client database 418. The CES backend server also includes stored information on fleet or transportation affiliates in database 420.

Figure 13:
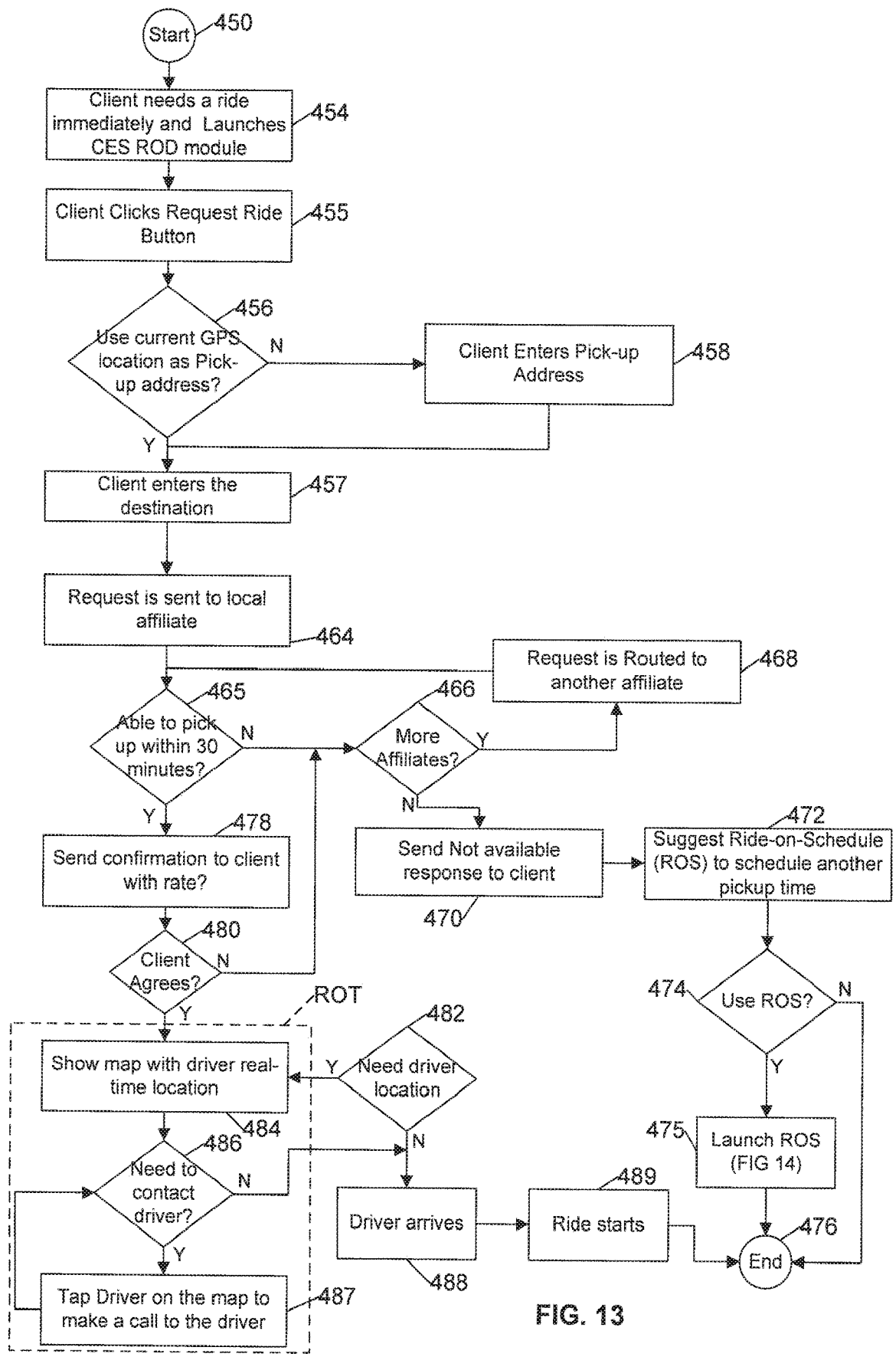
FIG. 13 is a flow diagram illustrating operation of the client ride-on-demand module of FIG. 11.
Figure 14:
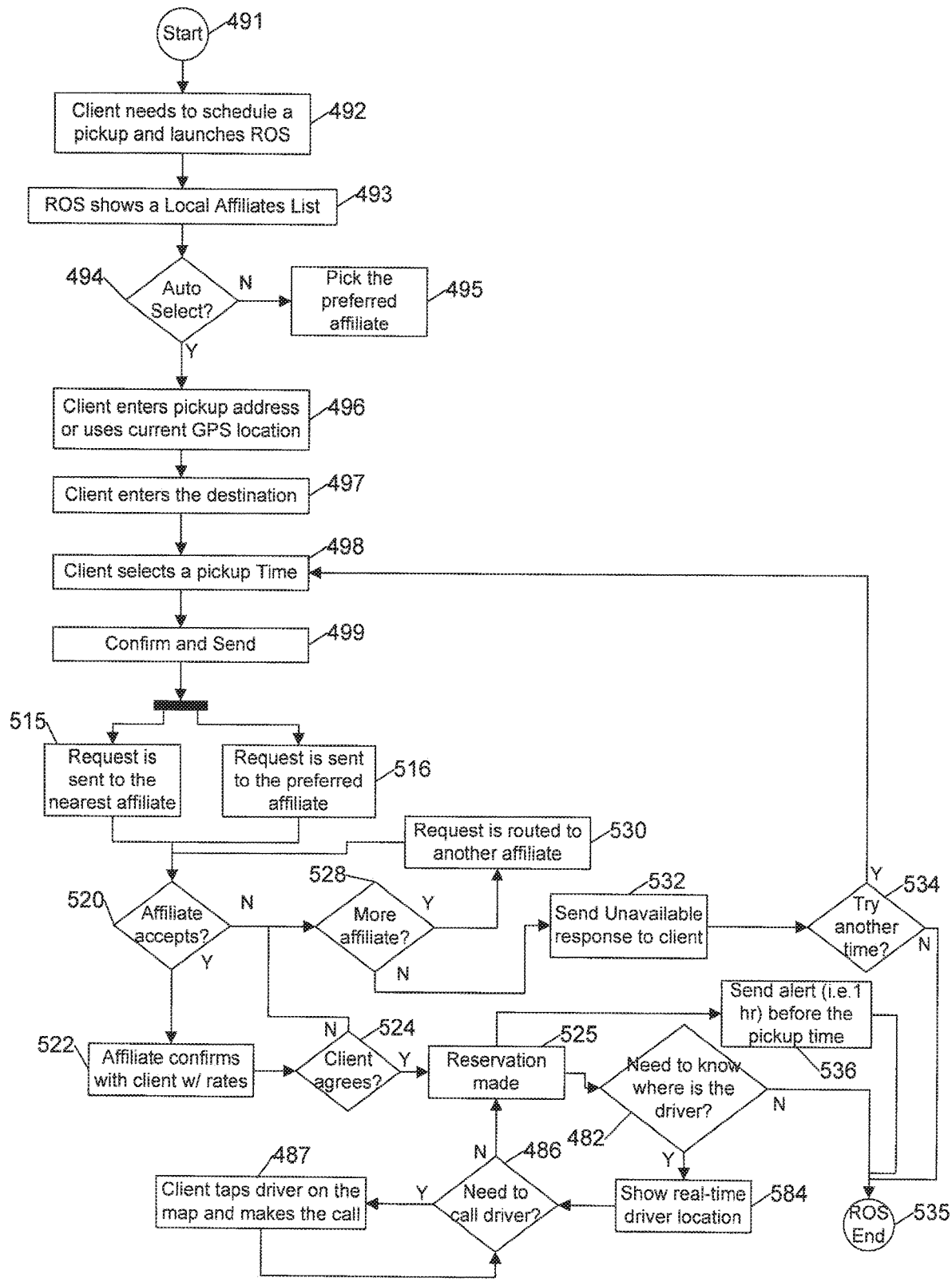
FIG. 14 is a flow diagram illustrating operation of the client ride-on-schedule module of FIG. 11.

The Ride-On-Demand (ROD) module is illustrated in more detail in FIG. 13 and is used for booking an urgent ride. Once the client has downloaded the EMP application and either registered for service or for one time use, or if they are a previously registered client, they can start the EMP application as needed at step 450. A user interface is then displayed on the display screen 452 of their mobile device (see FIGS. 16A to 16D) which includes buttons 451, 452, 453 at the top for selecting ROD, ROS, or ROC. If the client needs a ride immediately, they select ROD by touching button ROD 451 (step 454). This launches the CES ROD module, and a button "Request a Ride" is displayed. When the client clicks or touches the button to request a ride (step 455), a query appears on the screen asking if the client wishes to use their current GPS location as the pick up address (step 456). If the client picks "YES" at this step, they are prompted to enter the desired destination (step 457). If the client picks "NO" at step 456, they are prompted to enter the pick up address (step 458), and then prompted to enter the desired destination (step 456). Once the destination is entered, the clients' current GPS location and information on vehicle status from affiliates in the desired geographical area is used to automatically select a local affiliate based on availability and distance, and the request is sent to the local office for confirmation (step 464), with details of the client GPS location or requested pick up address and selected destination, along with a request (step 465) for confirmation that the affiliate's chauffeur is able to pick up the client within thirty minutes (or other selected time period). If the answer is NO, a search is made for more affiliates with vehicles in the area (step 466). If an affiliate with availability is found, the request is routed to that affiliate (step 468), and the new affiliate is asked if they can pick up within the selected time period (step 465). If no other affiliate with availability can be found, the client is sent a message indicating "Not Available" (step 470), and a recommendation is made to the client to select ride-on-schedule (ROS) to schedule another pick up time (step 472). If the client selects ROS (step 474), the ROS subroutine or module is launched (step 475) and proceeds as illustrated in FIG. 14, and the ROD ends (step 476). If the client does not want to reschedule at step 472, the ROD subroutine ends (476).

If the affiliate answer at step 465 is yes, they can pick up within the selected time period, a confirmation is sent to the client with the rate for the trip (step 478). The rate of trip is calculated based on the type of ride (dedicated or transfer) which is established by that particular industry (such as delivery, taxi, limousine, and so on). The client is asked to indicate whether or not they agree with the rate (step 480). If the client does not agree with the rate, the system searches for alternative affiliates at step 466 as described above. Once a ride is scheduled and confirmed at step 480 by pressing ORDER 481 on the user interface screen in FIG. 16A, the client is notified on the details of the pick-up on the screen of his/her mobile phone (see region 483 of display in FIG. 16A), and the GPS map is displayed on the screen with the icon "LOCATE" 490 (see FIG. 16B). If the client wishes to track the driver's current location using the ride on time module or ROT (step 482), they click on the LOCATE icon, and the driver's current location is displayed on the screen (step 484) along with driver contact information, speed, traffic information, car identifying information such as car model/color and license plate, and approximate arrival time (step 485). This information can be sent in text mode with a text description of the current vehicle location and estimated arrival time. The client can monitor the driver's progress on the map, and can contact the driver at any time (486) while the driver is traveling to the client's location, by tapping the car on the map (step 487). They are then able to communication with the driver via voice or message regarding any delays, concerns, or service changes. Monitoring of the vehicle position can continue after the driver arrives (488) and the client is picked up (489) until they reach the drop-off location. After the ride ends, the client's account (or the credit card/prepaid card) is billed or charged automatically for the service.

Figure 16D:
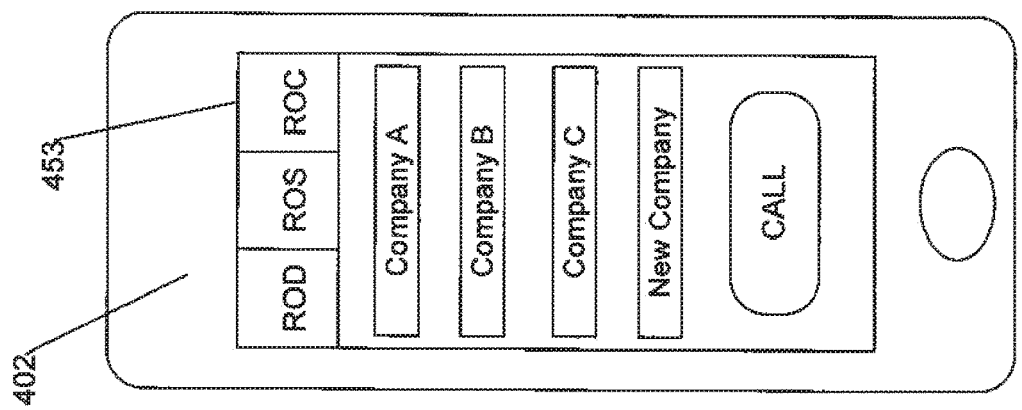
FIG. 16D illustrates the user interface screen of the EMP if the user opts for ride-on-call service of FIGS. 11 and 15.
Figure 16C:
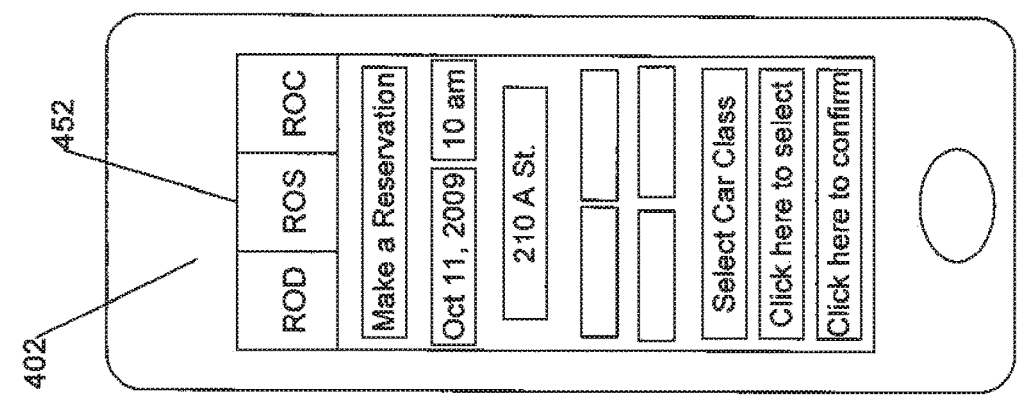
FIG. 16C illustrates the user interface screen of the EMP for making a future reservation via the ride-on-schedule module of FIGS. 11 and 14.

The Ride-On-Schedule module 406 is for users/clients to schedule a ride through any affiliated company at any time. FIG. 14 illustrates operation of the ROS module. At the start of the ROS 491, the user taps on the ROS icon 452 on the display screen to launch ROS (492), and a list of local affiliates appears on the screen (493). The user can opt to pick a preferred affiliate at step 494, and then picks an affiliate by tapping on the selected affiliate displayed on the screen (495), or picks auto select. After making the selection at step 494 or 495, the client is prompted to enter a pick up address or current GPS location (496), a destination (497), and a pick up time (498), along with any other options which may be provided by ROS. For example, the user may also pick a car type, as seen in FIG. 16C. After selecting pick-up location, destination, car type and time, and confirming the request (499), the request is sent either to the nearest affiliate (step 515) or the user selected affiliate (516), depending on which option was selected at step 494. If the affiliate accepts the request (520), the affiliate sends a confirmation with the rate for the trip (522). If the client agrees (524), the reservation is made (525). If the first selected affiliate at steps 515 or 516 does not accept the request at step 520, a search is made for additional affiliates (528), and the request is routed to another affiliate (530). If that affiliate accepts at step 520, the system proceeds to steps 522, 524 and 525 as described above. If the search for more affiliates at step 528 is unsuccessful, a service unavailable response 532 is sent to the user, and the user is asked if they wish to select a different pick up time (534). If they answer "YES" to this option, they are returned to a display screen at step 498 to allow entry of a different time, and the process proceeds as described above. If the client answers "NO" at step 534, the ROS subroutine ends (535). If the client does not agree to the affiliate's rate displayed at step 522, a search is made for more affiliates at step 528 as described above.

Figure 16B:
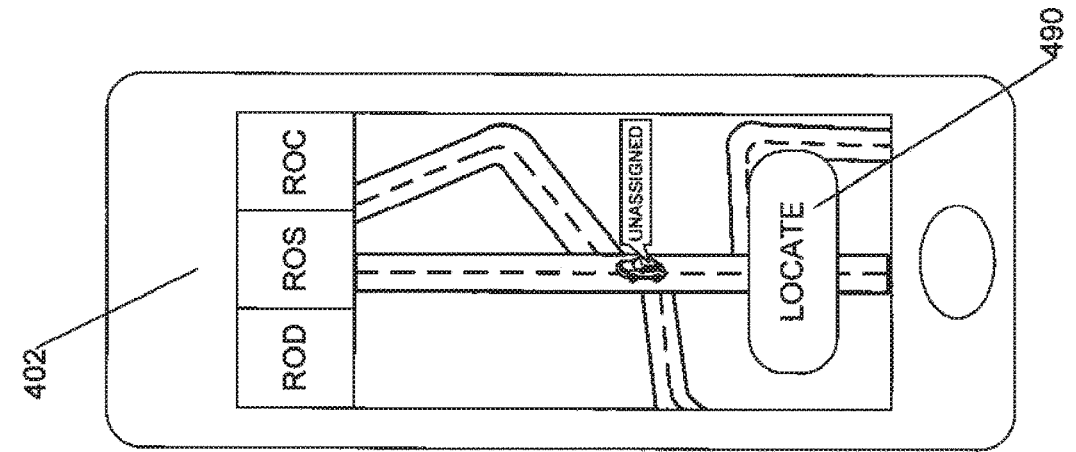
FIG. 16B illustrates the user interface screen of the EMP with a control button to select ride-on-time or vehicle location service of FIG. 11.
Figure 16A:
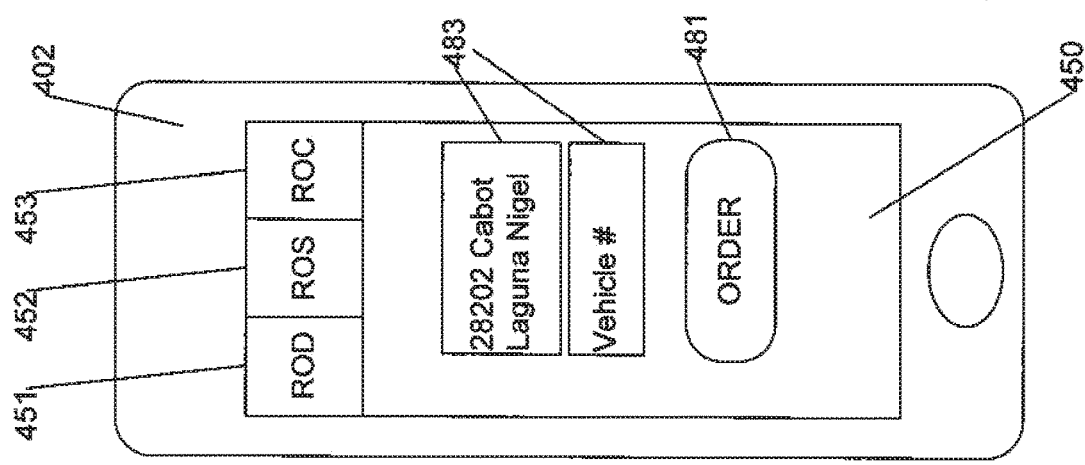
FIG. 16A illustrates a user interface screen of the end user mobile portal (EMP) of FIG. 11 after selection of the ride-on-demand service of FIGS. 11 and 13.

Once a reservation is made at step 525, whether with the first affiliate selected or a subsequent affiliate, the ROT option of FIG. 16B is displayed on the screen. The client or user can select ROT close to their pick up time by clicking on the LOCATE icon (step 482), after which the map shows the real time driver location (484) as described above in connection with FIG. 13, and the client has the option of calling the driver at any time (steps 486, 487). The ROS module also includes an automatic reminder which sends an alert to the client at a selected time interval before the pick up time, for example one hour or another selected time period (step 536). In the ROS module, users/clients can schedule a ride with any affiliated company at any time. In one embodiment, clients using ROS have the option of selecting pick-up location, destination, car type and time, users/clients are prompted with all the closest affiliate companies that provide the service for that market with price quote, company rating, and extra information (name, license, additional charge etc.) for them to decide which one to pick.

Figure 15:
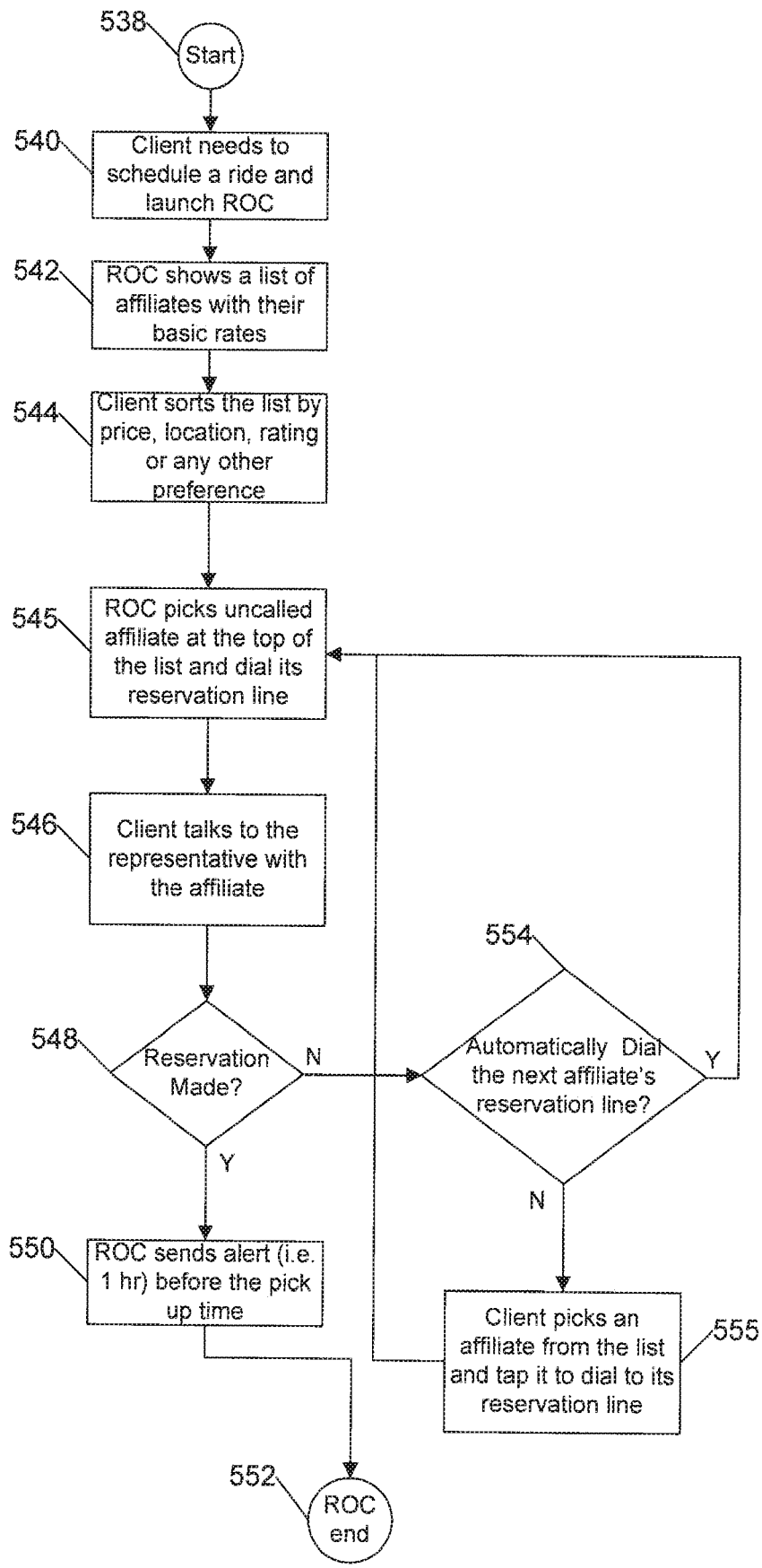
FIG. 15 is a flow diagram illustrating operation of the client ride-on-call module of FIG. 11.

The operation of the Ride-On-Call (ROC) module 408 is illustrated in the flow diagram of FIG. 15. This option is used to make a reservation by client's cell phone through a National Dispatch Center or when there is no available car on the ROD module (see step 470 of FIG. 13). Based on the client's current GPS location (by default) or any Point of Interest (POI) such as a landmark, airport, hotel, or the like, the ROC module enforces Geo-fencing, picks the affiliate company's phone number sorted by closest to the pick up location, and makes a call by one click. A registered client uses stored credentials to complete the booking and an occasional user can use his/her credit card to complete the booking. If the local affiliated company is not able to schedule the service (i.e. overbooked, line busy, etc.), ROC automatically tries the next nearest company until the service is booked successfully.

In one embodiment of the ROC 408, as illustrated in FIG. 15, the user starts the ROC (538) by first tapping on the ROC button or icon 453 on the display screen. This launches the ROC module (540). The ROC picks affiliates closest to the user's location (or a user selected point of interest) and displays a list of affiliates with their basic rates (542). The client may sort the list based on price, rating, location, or any other preference (step 544). The ROC then picks the uncalled affiliate at the top of the list and dials its reservation line (545). After the user is connected to the reservation line, they talk to the representative (546). If a reservation is made as a result of the call (548), the ROC is programmed to send an alert to the client at a selected time interval prior to the pick up time, such as one hour (step 550), and the ROC procedure ends (552). If a reservation is not made as a result of the first call at step 548, the client is asked whether they want the ROC to automatically dial the next affiliate's reservation line (step 554), and if they select "YES", the ROC automatically dials the reservation line of the next affiliate on the list at step 545, and the procedure continues as described above. If the client or user selects "NO" at step 554, the client can pick an affiliate from the list (step 555), the ROC calls the reservation line of the selected affiliate (step 545) and the procedure continues as above.

In any of the ROD, ROS or ROC procedures, the option of ROT is provided. As long as a user has a reservation via ROD, ROS or ROC, he or she can launch ROT as indicated in steps 482 to 487 of FIGS. 13 and 14 in order to obtain detailed information on the vehicle and to call the driver if desired.

The fleet management system and method described above automatically provides integrated, automated, and substantially real time fleet information on vehicle location and vehicle mechanical status. Transportation companies which have the GWU and CPS modules installed in their vehicles, along with the backend office system described above, can readily track and monitor all drivers, dispatch drivers efficiently to passenger pick up locations, guide each driver to complete each service from garage out to garage return automatically, and also determine if there are any traffic alerts or vehicle status alerts which require changes in mute and/or vehicle for a pick up. The addition of the DEP or data exchange platform to existing, heterogeneous back office systems of affiliated transportation companies allows such systems using different data communication languages to communicate with one another for more efficient usage of available vehicles, as described above. Finally, the addition of the end user mobile portals and CES back end server allows prospective passengers to call for a ride quickly and efficiently, at any time and in any location.

Those of skill will appreciate that the various illustrative logical blocks, units, modules, circuits, and algorithm steps described in connection with the embodiments disclosed herein can often be implemented as electronic hardware, computer software, or combinations of both. To clearly illustrate this interchangeability of hardware and software, various illustrative components, units, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks, components, units, and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A computer system-based and smart phone based method for controlling a fleet of automobiles, comprising:
   receiving by a first computer system a client request from a touchscreen of a client smart phone for pickup by an automobile at a first location and transportation by the automobile to a second location;
   determining by the first computer system a first available automobile in a fleet of automobiles proximate to a first location;
   the first computer system dispatching the first available automobile toward the first location;
   generating diagnostic data about the mechanical status of the first available automobile by a second computer on-board the first available automobile;
   notifying the client smart phone of a vehicle delay alert generated by the first computer system for the first available automobile based at least in part on said generating the diagnostic data;
   based at least in part on said generating of the vehicle delay alert, searching by the first computer system for a second available automobile;
   disabling the engine of the first available automobile by the first computer system after said generating diagnostic data; and
   dispatching by the first computer system the second available automobile toward the client.

2. The method of claim 1 wherein the mechanical status includes tire pressure.

3. The method of claim 1 wherein the mechanical status includes engine diagnostic messages.

4. The method of claim 1 wherein the mechanical status includes battery status.

5. The method of claim 1 wherein said generating diagnostic data is in real time.

6. The method of claim 1 which further comprises providing by the first computer system to the client smart phone a route from the current location of the automobile to the first location of the client.

7. The method of claim 1 which further comprises providing by the first computer system to the client smart phone a route from the first location to the second location.

8. The method of claim 1 which further comprises providing by the first computer system to a second smart phone in the one available automobile a route from the current location of the automobile to the first location of the client.

9. The method of claim 1 wherein said generating diagnostic data is before said indicating on a map the location of an available automobile.

10. The method of claim 1 wherein said generating diagnostic data is before said determining an available automobile.

11. The method of claim 1 wherein said notifying the client is before said disabling the engine.

12. The method of claim 1 wherein the mechanical status information includes automobile malfunctions.

13. The method of claim 1 wherein the mechanical status includes data about at least one chosen from the list of ignition on/off, real-time automobile mileage, brakes, gasoline gauge reading, engine diagnostics reading, theft protection features; automobile malfunctions, and automobile abuse.

14. The method of claim 1 which further comprises selecting by the client with the touchscreen one available automobile after said indicating a location.

15. The method of claim 1 which further comprises changing the availability status of the dispatched available automobile based at least in part on said generating a automobile delay alert.

16. The method of claim 1 wherein the availability status of a automobile based at least in part on diagnostic data generated by the second computer on-board the automobile.

* * * * *